United States Patent
Tritschler et al.

(10) Patent No.: US 10,651,762 B2
(45) Date of Patent: May 12, 2020

(54) MIMO CONVERTER

(71) Applicant: Blue Inductive GmbH, Freiburg (DE)

(72) Inventors: Johannes Tritschler, Freiburg (DE); Benriah Goeldi, Freiburg (DE)

(73) Assignee: Blue Inductive GmbH, Freiburg (DE)

( * ) Notice: Subject to any disclaimer, the term of this patent is extended or adjusted under 35 U.S.C. 154(b) by 45 days.

(21) Appl. No.: 16/087,806

(22) PCT Filed: Apr. 7, 2017

(86) PCT No.: PCT/EP2017/058436
§ 371 (c)(1),
(2) Date: Sep. 24, 2018

(87) PCT Pub. No.: WO2017/174799
PCT Pub. Date: Oct. 12, 2017

(65) Prior Publication Data
US 2019/0149060 A1     May 16, 2019

(30) Foreign Application Priority Data

Apr. 8, 2016  (EP) .................................... 16164409

(51) Int. Cl.
*H02M 7/06*   (2006.01)
*H02J 7/02*   (2016.01)
(Continued)

(52) U.S. Cl.
CPC ............. *H02M 7/064* (2013.01); *H02J 7/025* (2013.01); *H02J 50/12* (2016.02); *H02M 1/00* (2013.01);
(Continued)

(58) Field of Classification Search
CPC ........ H02M 7/064; H02M 1/00; H02M 7/217; H02M 7/219; H02M 7/64;
(Continued)

(56) References Cited

U.S. PATENT DOCUMENTS

| 5,953,223 A | 9/1999 | Kato et al. |
| 2002/0114172 A1 | 8/2002 | Webb et al. |

(Continued)

FOREIGN PATENT DOCUMENTS

KR    10 2009 008635 A1    8/2010

OTHER PUBLICATIONS

International Search Report and Written Opinion dated Jun. 20, 2017 in connection with Application No PCT/EP2017/058436.
(Continued)

*Primary Examiner* — Robert L Deberadinis
(74) *Attorney, Agent, or Firm* — Wolf, Greenfield & Sacks, P.C.

(57) ABSTRACT

An efficient solution to the problem of converting alternating signals into a plurality of signals having different signal characteristics in observation of different application requirements. This is achieved by a multiple input multiple output converter operated at a secondary side of an inductive power transfer system for converting at least one alternating input signal into a rectified alternating input signal and a further signal derived by averaging a switched voltage generated during rectification of the alternating input signal. The multiple input multiple output converter comprises at least one rectifier circuit adapted to rectify the alternating input signal and at least one averaging circuit adapted to average the switched voltage which is generated during rectification operation of the eat least one alternating input signal.

20 Claims, 20 Drawing Sheets

(51) Int. Cl.
  *H02J 50/12* (2016.01)
  *H02M 7/217* (2006.01)
  *H02M 7/64* (2006.01)
  *H02M 1/00* (2006.01)
  *H02M 7/219* (2006.01)

(52) U.S. Cl.
  CPC ........... *H02M 7/217* (2013.01); *H02M 7/219* (2013.01); *H02M 7/64* (2013.01); *H02M 2001/008* (2013.01); *H02M 2001/009* (2013.01)

(58) Field of Classification Search
  CPC ....... H02M 2001/008; H02M 2001/009; H02J 50/12; H02J 7/025
  See application file for complete search history.

(56) References Cited

U.S. PATENT DOCUMENTS

| | | |
|---|---|---|
| 2008/0265670 A1 | 10/2008 | Pansier |
| 2012/0187869 A1 | 7/2012 | Angelin et al. |
| 2013/0128638 A1 | 5/2013 | Irish |
| 2014/0306631 A1 | 10/2014 | Jansen |
| 2015/0061578 A1 | 3/2015 | Keeling et al. |

OTHER PUBLICATIONS

Extended European Search Report for European Application No. 16164409.1, dated Mar. 22, 2017.
Examination Report for European Application No. 16164409.1, dated Sep. 26, 2018.
Hassan et al., Design of deal-output alternators with switched-mode rectification. IEEE 34th Annual Power Electronics Specialists Conference. Jun. 2003.;4:1992-2000.

(a)

(b)

(a)

(b)

(c)

MIMO CONVERTER

CROSS-REFERENCE TO RELATED APPLICATIONS

This Application is a national stage filing under 35 U.S.C. 371 of International Patent Application Serial No. PCT/EP2017/058436, filed Apr. 7, 2017, which claims priority to European application number 16164409.1, filed Apr. 8, 2016. The entire contents of these applications are incorporated herein by reference in their entirety.

FIELD OF INVENTION

The present invention relates to a multiple input multiple output converter for converting at least one alternating input signal into a rectified output signal and a signal derived by averaging a switched voltage signal generated during rectification of the alternating input signal, a power supply system for supplying electric power to a plurality of loads and/or energy storage devices which uses the multiple input multiple output converter according to the present invention, and a method of operating the multiple input multiple output converter according to the present invention.

TECHNICAL BACKGROUND

A typical application of rectifiers is the field of wireless inductive power transmission. Generally, wireless inductive power transmission has several advantages over cable connected systems. Due to technological advancements, wireless inductive power transmission to mobile batteries gains increasing attention and the trend is driven by automotive, consumer, and industrial applications.

Generally, wireless inductive power transmission divides into a primary stationary side and a secondary mobile side. The primary stationary side has a switched mode electronic circuitry and a resonant circuitry consisting of capacitors and a transmission coil.

FIG. 23 shows a schematic diagram of a secondary side in an inductive power transfer system known in the art.

As shown in FIG. 23, at the secondary mobile side, a voltage and a current are induced at a receiving coil forming part of a resonant circuit. A passive or an active rectifier feeds power directly to a battery, accumulator or to a mobile energy system which consists of several loads, e.g., DC/DC converters and energy storage devices such as batteries, accumulators, capacitors, condensers, supercapacitors, ultra-capacitors, etc.

As shown in FIG. 23, the secondary receiving side of a wireless inductive power transfer system comprises an energy storage device E1, E2 or load. Usually there are several voltage levels used at the receiving side. However, if two energy storage devices E1, E2 or loads are to be supplied with power in parallel, at least one DC/DC converter is needed to decouple the first energy storage device E1 or load from the second energy storage device E2 or load.

However, this implies extra circuitry leading to higher costs, weight, and circuit complexity at the secondary receiving side. Additionally, losses in DC/DC conversion lead to decreased system efficiency.

SUMMARY OF INVENTION

In view of the above, the object of the invention is to provide a more efficient solution to the problem of converting alternating signals into a plurality of signals having different signal characteristics in observation of different application requirements.

According to a first aspect of the present invention there is provided a multiple input multiple output converter for converting at least one alternating input signal into a rectified output signal and a further output signal derived by averaging a switched voltage signal generated during rectification of the alternating input signal.

The multiple input multiple output converter according to the first aspect of the invention comprises a plurality of converter input terminals for input of the at least one alternating input signal to the multiple input multiple output converter and a plurality of converter output terminals separated into a first converter output terminal group for output of at least one rectified signal and a second converter output terminal group for output of at least one averaged switched voltage signal.

In more detail, the multiple input multiple output converter, according to the first aspect of the invention, comprises at least one rectifier circuit adapted to rectify the alternating input signal. According to the first aspect of the present invention the at least one rectifier circuit has a rectifier input terminal connected to a related converter input terminal and a rectifier output terminal connected to a related converter output terminal of the first converter output terminal group for output of the rectified alternating input signal.

Still further, the multiple input multiple output converter according to the first aspect of the invention comprises at least one averaging circuit adapted to average the switched voltage signal which is generated during rectification operation. According to the first aspect of the present invention the at least one averaging circuit has a first input terminal connected to the internal circuit node of the at least one rectifier circuit and a second output terminal connected to a related converter output terminal of the second converter output terminal group for output of an averaged switched voltage signal.

According to a second aspect of the present invention there is provided a power supply system for supplying electric power to a plurality of loads and/or energy storage devices which uses the multiple input multiple output converter according to the first aspect of the present invention.

According to the second aspect of the present invention the multiple input multiple output converter according to the first aspect of the present invention is used to convert at least one alternating input signal into at least one rectified signal for output at a first output terminal group and further into at least one averaged voltage signal derived from a switched voltage signal generated during rectification of the at least one alternating input signal for output at a second output terminal group.

Further, according to the second aspect of the present invention at least one first energy storage device or first load is connected to at least one output terminal of the first output terminal group and at least one second energy storage device or second load is connected to at least one output terminal of the second output terminal group so as to balance the voltage of the at least one first energy storage device or first load with respect to the voltage of the at least one second energy storage device or second load.

According to a third aspect of the present invention there is provided a method of operating the multiple input multiple output converter according to the first aspect of the present invention.

According to the third aspect of the present invention the method of operating the multiple input multiple output converter comprises a step of rectifying an alternating input signal for output of a rectified alternating input signal as a signal having the first signal characteristics.

Further, according to the third aspect of the present invention the method of operating the multiple input multiple output converter comprises a step of averaging a switched voltage signal which is generated during rectification of the alternating input signal for output of an averaged switched voltage signal as a signal having the second signal characteristics.

According to a fourth aspect of the present invention there is provided a secondary side of an inductive power supply system for supply of electric power to at least one load and/or at least one energy storage device having voltage source characteristics. The secondary side of the inductive power supply system comprises a series connection of a secondary receiver coil and a secondary side compensation capacitor being separated from the primary side of the inductive power supply system adapted to receive of energy transmitted from a transmitter coil of the inductive power supply system through inductive coupling and adapted to generate a secondary side high frequency current having current source characteristics.

Further, the secondary side of an inductive power supply system has a multiple input multiple output converter according to the first aspect of the present invention which is connected to the series connection of the receiver coil and the compensation capacitor and adapted to convert the secondary side high frequency current into at least one signal having first rectified signal characteristics and at least one signal having second averaged signal characteristics being different from the first rectified signal characteristics.

Further, the secondary side of an inductive power supply system has at least one energy storing device being connected to the first converter output terminal group and having voltage source characteristics and a load or at least one further energy storing device connected to the second converter output terminal group.

DESCRIPTION OF DRAWING

In the following, different exemplary embodiments of the present invention will be explained with referenced to the drawing in which.

DETAILED DESCRIPTION OF INVENTION

Figure 1:
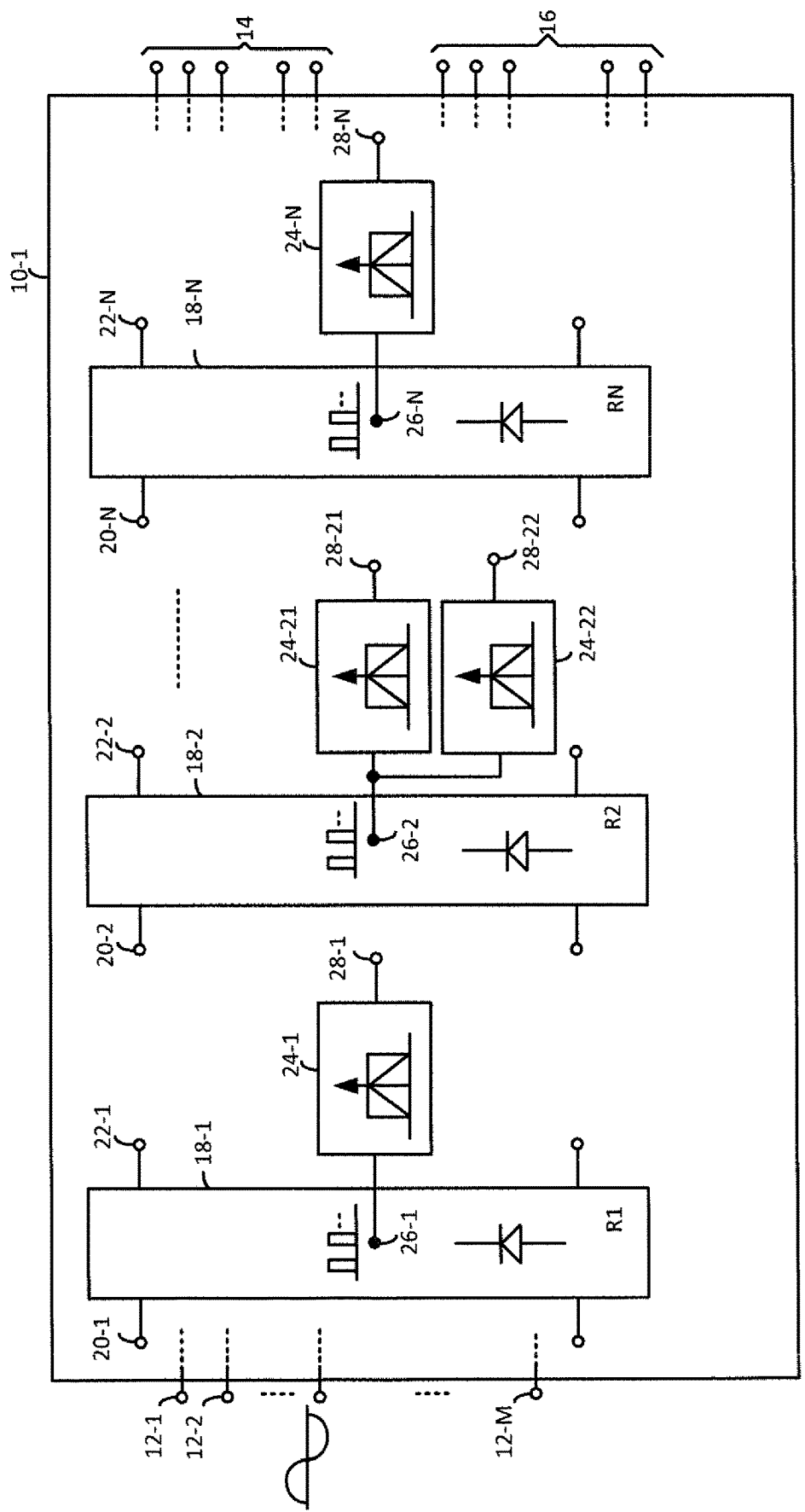
FIG. 1 shows a schematic diagram of a multiple input multiple output converter according to a first exemplary embodiment of the present invention.

In the following, the present invention will be explained in detail with reference to the drawing. Here, it should be understood that such explanation is related to exemplary embodiments of the present invention only and not binding to the scope of the present invention as defined by the claims. As far as reference is made to specific circuit components, this is to be considered as example for the underlying functionality, where the circuit components are clearly exchangeable as long as the same functionality is achieved.

The functionality of the multiple input multiple output converter according to the present invention is manifold. It supports an approach of converting an alternating input signal into a plurality of output signals having multiple types of signal characteristics at minimized hardware effort, e.g., an approach to parallel signal rectification and signal averaging while controlling the amount of power delivered at the output side of the multiple input multiple output rectifier.

Further, the multiple input multiple output converter according to the present invention also supports an exchange of energy between energy storages that may be connected to the multiple input multiple output converter. Generally, the present invention achieves balancing of voltage levels of a plurality of such energy storage devices with respect to corresponding rated voltage levels.

Further, according to the present invention there is suggested a multiple input multiple output converter that allows decoupling of different loads or storage devices connected to its output terminals without mandatory use of an additional DC/DC-converter or an additional active component.

Within the framework of the present invention the multiple input multiple output converter form part of a secondary side of an inductive power supply system for supply of electric power to at least one load and/or at least one energy storage device having voltage source characteristics. The secondary side comprises a series connection of a secondary receiver coil and a secondary side compensation capacitor being separated from the primary side of the inductive power supply system adapted to receive energy transmitted from a transmitter coil of the inductive power supply system through inductive coupling and adapted to generate a secondary side high frequency current having current source characteristics.

In the secondary side of the inductive power supply system the multiple input multiple output converter is connected to the series connection of the receiver coil and the compensation capacitor and adapted to convert the secondary side high frequency current into at least one signal having first rectified signal characteristics and at least one signal having second averaged signal characteristics being different from the first rectified signal characteristics. Also, in the secondary side of the inductive power supply system at least one energy storing device having voltage source characteristics is connected to the first converter output terminal group and a load or at least one further energy storing device is connected to the second converter output terminal group.

Overall the present invention provides a multiple input multiple output converter at low cost and with small weight and size. This can be particularly advantageous when the multiple input multiple output converter is used at the secondary side of an inductive power transfer system due to a resulting increased system efficiency of the inductive power transfer system.

FIG. 1 shows a schematic diagram of a multiple input multiple output converter 10-1 according to a first exemplary embodiment of the present invention.

As shown in FIG. 1, the multiple input multiple output converter 10-1 comprises a plurality of converter input terminals 12-1, 12-2, . . . , 12-M for input of the at least one alternating input signal to the multiple input multiple output converter 10-1. Generally, the alternating input signal may be of any type, e.g., a sinus signal, a trapezoidal signal, a square wave signal, etc. Further, the first signal characteristic may be a result of rectification and the second signal characteristic may be a result of an averaging process.

As shown in FIG. 1, the multiple input multiple output converter 10-1 comprises a plurality of converter output terminals separated into a first converter output terminal group 14 for output of the at least one signal having the first signal characteristics and a second converter output terminal group 16 for output of the at least one signal having the second signal characteristics.

As shown in FIG. 1, the multiple input multiple output converter 10-1 comprises at least one rectifier circuit 18-1, 18-2, . . . , 18-N adapted to rectify an alternating input signal. The at least one rectifier circuit 18-1, 18-2, . . . , 18-N has a rectifier input terminal 20-1, 20-2, . . . , 20-N connected to at least one related converter input terminal 12-1, 12-2, . . . , 12-M and a rectifier output terminal 22-1, 22-2, . . . , 22-N connected to a related converter output terminal of the first converter output terminal group 14 for output of a rectified alternating input signal as a signal having the first signal characteristics.

As shown in FIG. 1, the multiple input multiple output converter 10-1 comprises at least one averaging circuit 24-1, 24-21, 24-22, . . . , 24-N adapted to average a switched voltage signal which is generated at an internal circuit node 26-1, 26-2, . . . , 26-N of the at least one rectifier circuit 18-1, 18-2, . . . , 18-N during rectification operation.

It should be noted that according to the present invention the number of averaging circuits provided per rectifier circuit 18-1, 18-2, . . . , 18-N is not limited to a value of one, but may also be a higher value, e.g., a value of two as shown in FIG. 1 with respect to the second rectifier circuit 18-2 having a first averaging circuit 28-21 and a second averaging circuit 28-22. Alternatively, according to the present invention there may be also provided a rectifier circuit having no averaging circuit connected thereto as long as the multiple input multiple output converter 10-1 comprises at least one averaging circuit.

As shown in FIG. 1, the at least one averaging circuit 24-1, 24-21, 24-22, . . . , 24-N has a first input terminal connected to the internal circuit node 26-1, 26-2, . . . , 26-N of the at least one rectifier circuit 18-1, 18-2, . . . , 18-N and a second output terminal 28-1, 28-21, 28-22, . . . , 28-N connected to a related converter output terminal of the second converter output terminal group 16 for output of an averaged switched voltage signal as a signal having the second signal characteristics.

As outlined above, operatively the multiple input multiple output converter 10-1 according to the first exemplary embodiment of the present invention is adapted to convert at least one alternating input signal into at least one signal having first rectified signal characteristics and into at least one signal having second averaged signal characteristics being different from the first rectified signal characteristics.

Further, operatively the multiple input multiple output converter 10-1 according to the first exemplary embodiment of the present invention rectifies an alternating input signal for output of a rectified alternating input signal as a signal having the first rectified signal characteristics.

Further, operatively the multiple input multiple output converter 10-1 according to the first exemplary embodiment of the present invention averages a switched voltage signal which is generated during rectification of the alternating input signal for output of an averaged switched voltage signal as a signal having the second averaged signal characteristics.

In the following further preferred exemplary embodiments of the present invention will be explained with reference to FIG. 2 to FIG. 22. Insofar as converter components of these exemplary embodiments have similar functionality as converter components described with reference to FIG. 1 the same reference numerals will be used for ease of explanation. Further, the specific embodiments of the present invention will be described in the following with respect to half wave rectification, fully bridge rectification, and multiphase rectification in combination with averaging of a switched voltage generated during rectification operation.

Figure 2:
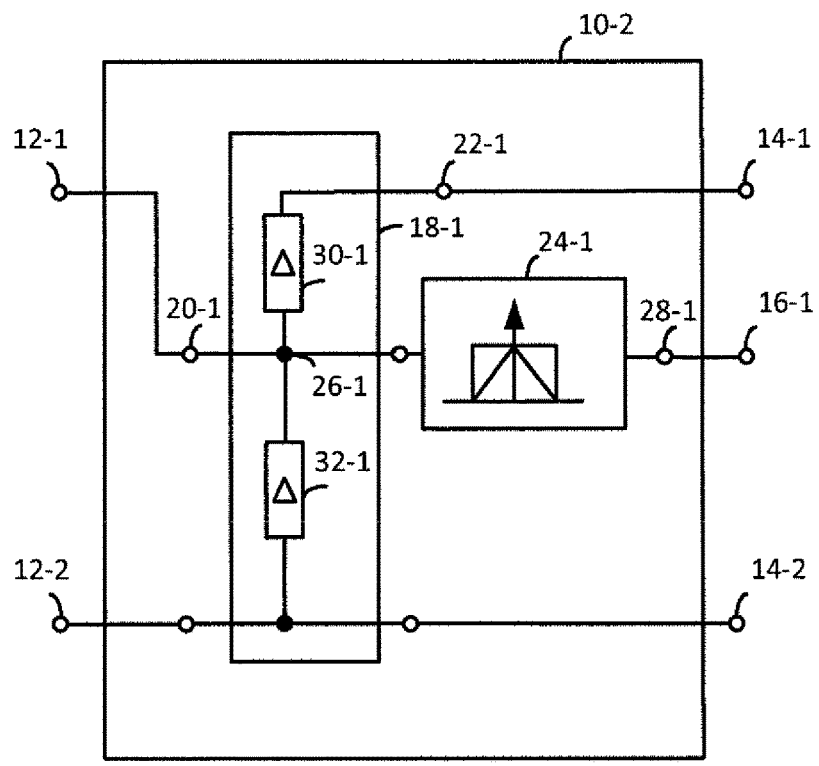
FIG. 2 shows a schematic diagram of a multiple input multiple output converter according to a second exemplary embodiment of the present invention.

FIG. 2 shows a schematic diagram of a multiple input multiple output converter 10-2 according to a second exemplary embodiment of the present invention.

As shown in FIG. 2, the multiple input multiple output converter 10-2 comprises one rectifier circuit 18-1. Further, the rectifier circuit 18-1 comprises a half bridge set up from a pair of an upper rectifying circuit element 30-1 and of a lower rectifying circuit element 32-1 connected in series to each other. In more detail, the upper rectifying circuit element 30-1 and the lower rectifying circuit element 32-1 are connected to each other at an internal circuit node 26-1 of the rectifier circuit 18-1.

As shown in FIG. 2, the other connection terminal of the upper rectifying circuit element 30-1 forms an upper half bridge output terminal as a rectifier output terminal 22-2 connected to a related converter output terminal 14-1 of the first converter output terminal group 14 for output of a rectified alternating input signal as a signal having the first, rectified signal characteristics.

As shown in FIG. 2, the other connection terminal of the lower rectifying circuit element 32-1 forms a further rectifier output terminal connected to a reference converter output terminal 14-2 of the first converter output terminal group 14.

As shown in FIG. 2, the multiple input multiple output converter 10-2 comprises one averaging circuit 24-1. The averaging circuit 24-1 has its first connection terminal connected to the internal circuit node 26-1 of the associated rectifier circuit 18-1 and its second connection terminal 28-1 connected to a related converter output terminal 16-1 of the second converter output terminal group 16-1.

Operatively, the alternating input signal will be rectified by the upper rectifying circuit element 30-1 and the lower rectifying circuit element 32-1 such that during a first period with positive amplitude of the alternating input signal the upper rectifying circuit element 30-1 is in a conducting state and the lower rectifying circuit element 32-1 is in a non-conducting state so as to forward the alternating input signal to the related converter output terminal 14-1 of the first converter output terminal group 14 as first converter output signal having first, rectified signal characteristics.

It should be noted that due to the conducting state of the upper rectifying circuit element 30-1 and due to non-conducting state of the lower rectifying circuit element 32-1 the voltage at the converter output terminals 14-1, 14-2 will be mapped to the internal circuit node 26-1 of the rectifier circuit 18-1 during rectification operation.

Assuming without loss of generality that the load connected to the converter output terminal 14-1 has energy storage characteristics then a voltage at the converter output terminals 14-1, 14-2 will be a DC-voltage or an approximation thereto and the voltage at the internal circuit node 26-1 is a switched square wave voltage according to the conductive and non-conductive state of the upper rectifying circuit element 30-1.

Further, operatively during a second period with negative amplitude of the alternating input signal the upper rectifying circuit element 30-1 is in a non-conducting state and the lower rectifying circuit element 32-1 is in a conducting state so as to block the forwarding of the alternating input signal to the converter output terminal 14-1 of the first converter output terminal group 14.

Further, operatively the averaging circuit 24-1 generates an average of the switched square wave voltage which is generated at the internal circuit node 26-1 of the rectifier circuit 18-1 during rectification operation. Alternatively, the averaging circuit 24-1 applies the averaging functionality to any other signal type that may be generated at the internal circuit node 26-1 due to rectification operation and depending on the type of load being connected to the multiple input multiple output converter 10-2.

In more detail, when the switched square wave voltage is available at the internal circuit node 26-1 of the rectifier circuit 18-1, during the first period with positive amplitude of the alternating input signal, the averaging circuit 24-1 will accumulate related energy in an energy buffer, e.g., a coil, a series resonant circuit, or a parallel resonant circuit.

Figure 3:
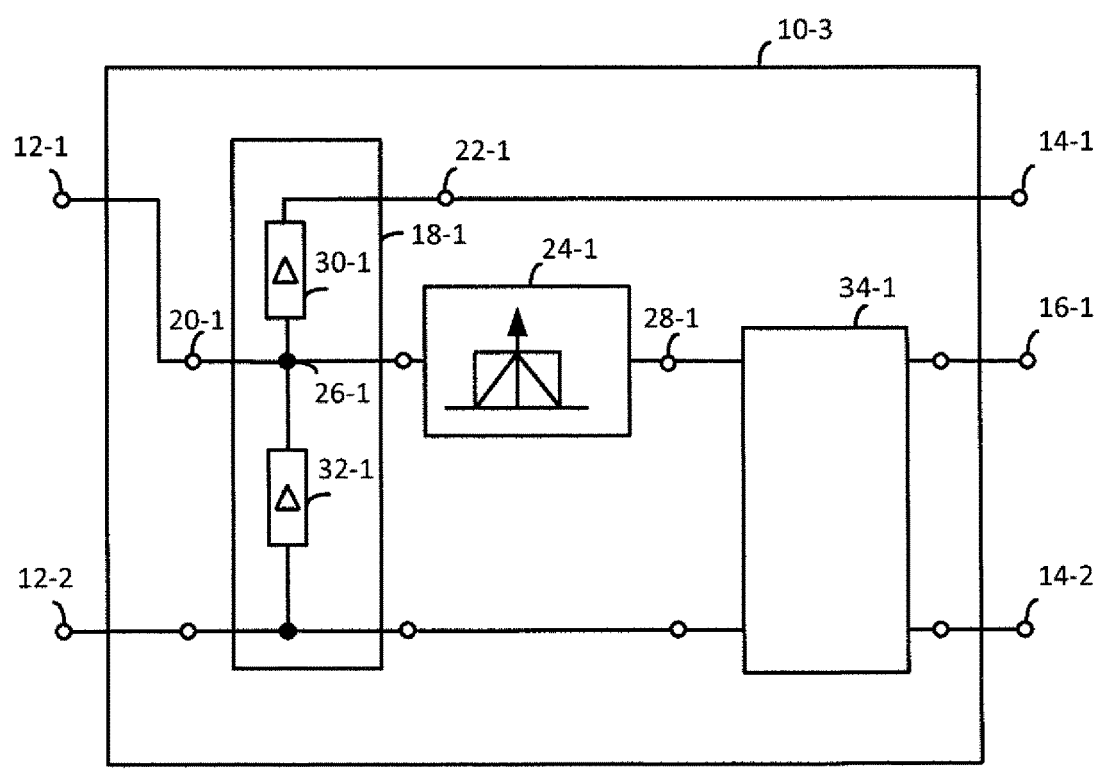
FIG. 3 shows a schematic diagram of a multiple input multiple output converter according to a third exemplary embodiment of the present invention.

FIG. 3 shows a schematic diagram of a multiple input multiple output converter 10-3 according to a third exemplary embodiment of the present invention.

As shown in FIG. 3, the multiple input multiple output converter 10-3 according to the third exemplary embodiment has the same structure as the multiple input multiple output converter 10-2 according to a second exemplary embodiment, however, additionally comprises a voltage converter 34-1. The voltage converter 34-1 is connected to the second connection terminal 28-1 of the averaging circuit 24-1 generating the averaged switched square wave voltage and a related converter output terminal 16-1 of the second converter output terminal group 16. The voltage converter 34-1 may be an analogue voltage converter or a switched voltage converter.

Operatively, the multiple input multiple output converter 10-3 according to the third exemplary embodiment has the same functionality as the multiple input multiple output converter 10-2 according to the second exemplary embodiment. Therefor related explanations outlined above with respect to FIG. 2 will not be repeated here.

The difference between the multiple input multiple output converter 10-3 according to the third exemplary embodiment and the second exemplary embodiment lies in the operation of the voltage converter 34-1. Here, operatively the voltage converter 34-1 is adapted to vary the voltage level of an averaged switched square wave voltage which is generated by the averaging circuit 24-1.

Thus the multiple input multiple output converter 10-3 according to the third exemplary embodiment achieves increased flexibility with respect to the averaging functionality in comparison to the multiple input multiple output converter 10-2 according to the second exemplary embodiment.

Figure 4:
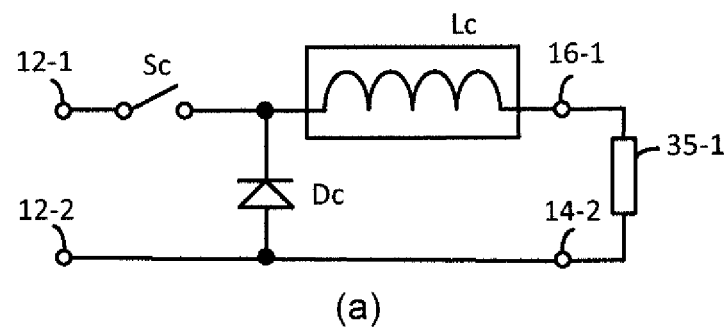
FIG. 4 shows a schematic diagram to illustrate re-use of circuit components in a multiple input multiple output converter according to the present invention for realization of multiple functionalities while optimizing use of hardware resources.
Figure 4:
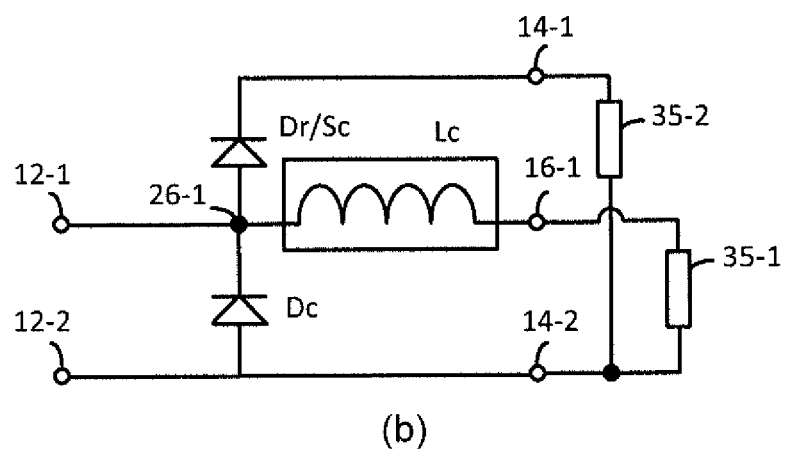
Figure 4:
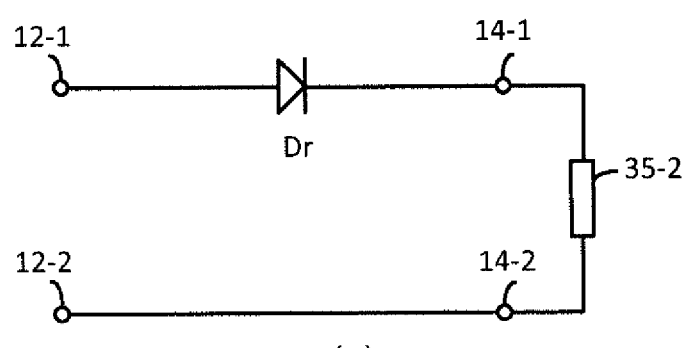

FIG. 4 shows a schematic diagram to illustrate re-use of circuit components in the multiple input multiple output converters according to the present invention for realization of multiple functionalities while optimizing use of hardware resources.

In more detail, FIG. 4(a) a schematic diagram of a buck converter also referred to as step down converter in the following.

Operatively, in the buck converter the switch Sc will be turn on and off in a periodic manner. This allows the transfer of electrical energy from the input side to the output side of the buck converter when the switch Sc is closed. On the other hand, the coil Lc serves as an energy buffer and allows to also supply energy to the load Lc when the switch Sc is open. Generally, the voltage at the output side will be stepped down compared to the input side and the step down ratio depends on the switching rate of the switch Sc.

Further, FIG. 4(c) there is shown a half wave rectifier using a diode Dr for supply of a rectified input signal to a load Lr.

Further, FIG. 4(b) shows the concept of multiple use of circuit elements to achieve both rectification functionality and step down conversion functionality with the same electric components.

In more detail, FIG. 4(b) shows two diodes Dr, Dc to realize a rectifier functionality.

As shown in FIG. 4(b) the upper diode Dr of the half bridge on the one hand implements the functionality of the switch Sc and on the other hand the rectifying functionality. Similarly, the lower diode realizes the functionality of the buck converter diode Dc shown in FIG. 4(a) and at the same time the rectifier functionality.

It is this double use of circuit components according to the present invention that enables most efficient use of hardware resources at reduced cost and space requirements while at the same time increasing functional flexibility of the multiple input multiple output converters according to the present invention.

Figure 5:
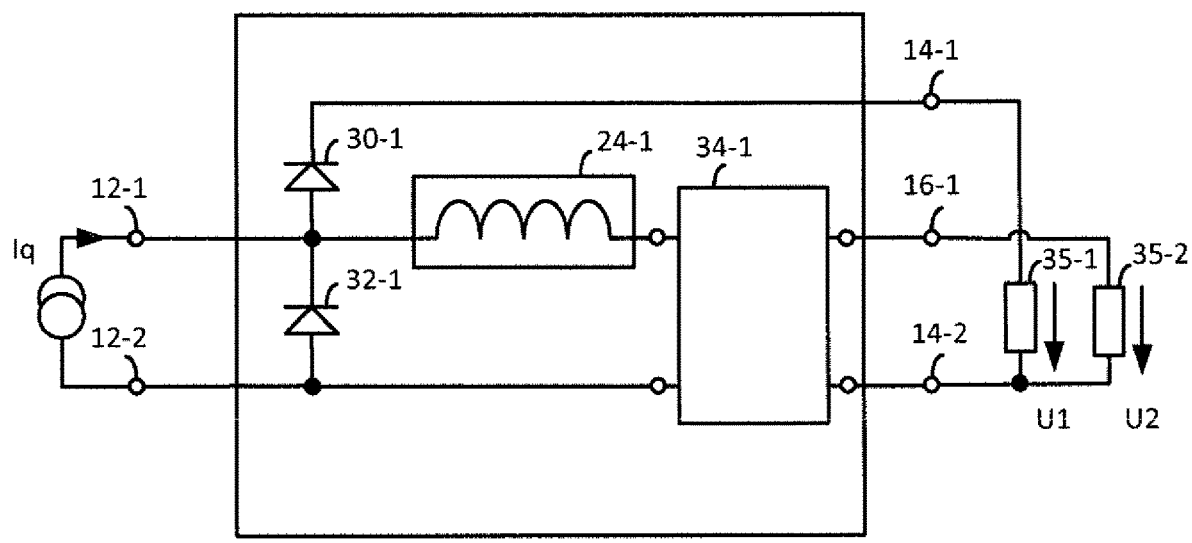
FIG. 5 shows an analysis of circuit behavior of the multiple input multiple output converter according to the present invention in a case where the input signal has current source characteristic.
Figure 5:
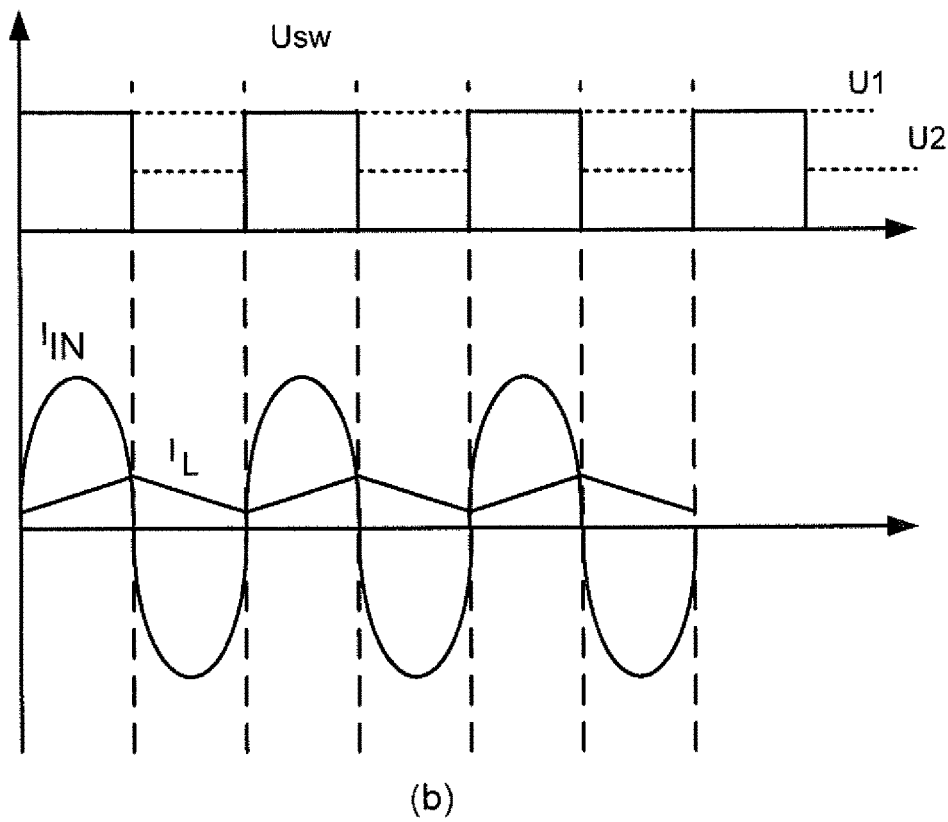

FIG. 5 shows an analysis of an exemplary circuit behavior of the multiple input multiple output converter according to the present invention in a case where the input signal has current source characteristic.

In more details, FIG. 5 shows voltage levels that occur during operation of the multiple input multiple output converter according to the present invention. In a non-binding manner it may be assumed that to the first converter output terminal group 14 there is connected an energy storing device 35-11 and that to the second converter output terminal group 16 there is connected a load 35-2.

Generally, the voltage output by an averaging circuit 24-1, 24-2, . . . , 24-N according to the present invention will reflect a mean value of the switched voltage generated at internal circuit nodes 26-1, 26-2, . . . , 26-N of the associated rectifier circuit 18-1, 18-2, . . . , 18-N.

More specifically, in case the input signal has current source characteristics the input current $I_{IN}$ will be a periodic signal, e.g., having equally long periods of positive and negative amplitude. Then the upper rectifying element 30-1, e.g., a diode, will be conductive during a half of the operation time and the lower rectifying element 30-2, e.g., a diode, will be conductive during the other half of the operation time.

From the above it follows that the switched voltage at the internal circuit node 26-1 of the rectifier will be U1 during the first half of the operation time and will be 0V during the other half of the operation time. Thus, without provision of the voltage controller 34-1 a relation of U2=U1/2 applies.

Further, in case that the input signal has current source characteristics and a that dc offset applies the period of conductivity the upper rectifying element 30-1 and the lower rectifying element 30-2 will be different so that U2 may also be different from a value of U1/2.

Figure 6:
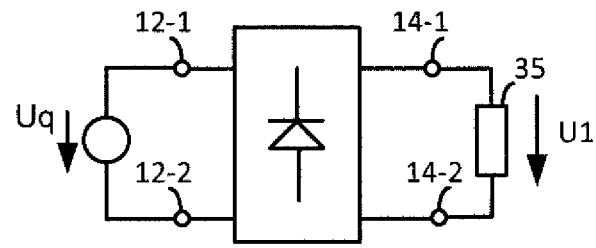
FIG. 6 shows an analysis of circuit behavior of the multiple input multiple output converter according to the present invention in a case where the input signal has voltage source characteristic and an example of a voltage controller.
Figure 6:
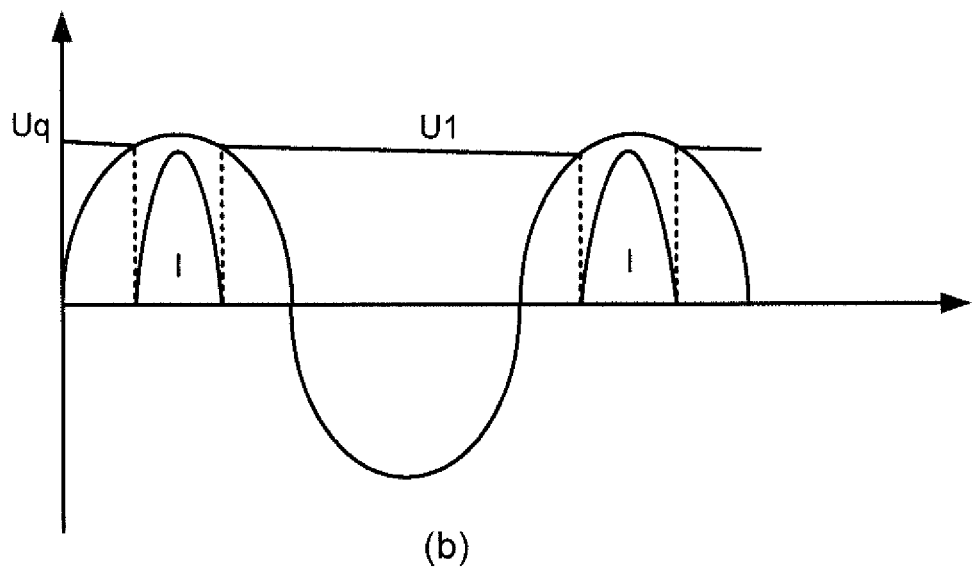
Figure 6:
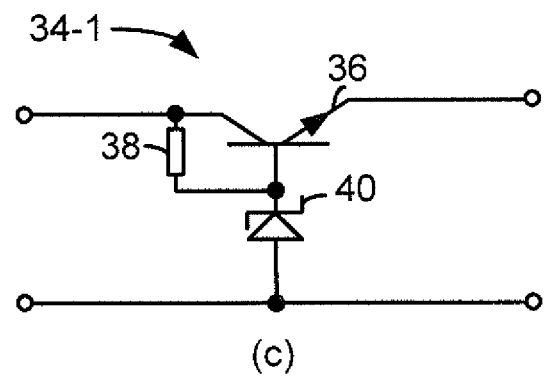

As shown in FIG. 5(b) in both cases of U2=U1/2 and U2≠U1/2 the step down converter 34-1 will operate in a continuous mode where supply of energy to the averaging circuit 24-1 is always restarted before the current IL, e.g., a coil current, reaches a value of zero. However, it should be understood that the present invention is not restricted to an operation in a continuous mode and that the current IL may as well reach zero level FIG. 6 shows an analysis of the circuit behavior of the multiple input multiple output converter according to the present invention in a case where the input signal has voltage source characteristic and an example of a voltage converter.

In more detail, FIG. 6(b) illustrates a first specific case that corresponds to a constellation where a load 35-1 which is connected to the first converter output terminal group 14 has voltage source characteristics, e.g., is an energy storage device or a load having a capacitor connected parallel to the load.

As shown in FIG. 6(b), according to the first specific case the input voltage $U_{IN}$ is a variable voltage which initially is smaller than the voltage U1 and after a certain period of time gets larger than U1. Then a rectifying circuit element of the multiple input multiple output converter, e.g., a diode, will become conductive and $U1=U_{IN}$ applies. In more detail during such period $U1=U_{IN}=U_{SW}$ applies and the output voltage U2 is the mean of $U_{SW}=U1=U_{IN}$ and thus may take on any value smaller than U1.

A further second specific case where the input signal has voltage source characteristic is related to an input voltage $U_{IN}$ is a square wave voltage with variable duty cycle. Here the value of U2 depends on the duty cycle of the voltage $U_{IN}$.

In conclusion without provision of a voltage converter 34-1 the voltage U2 will be a controlled voltage being dependent from the switched voltage $U_{SW}$. Further, the voltage $U_{SW}$ depends from the input current $I_{IN}$ when the input signal has current source characteristic and from the input voltage $U_{IN}$ when the input signal has a voltage source characteristic.

As shown in FIG. 6(c), generally the value of the voltage U2 may be varied by the voltage converter 34-1 which may be of any type selected from analogue voltage converter or voltage stabilizer. FIG. 6(c) shows one option to realize the voltage converter 34-1 using a transistor 36, e.g., a Bc547, an input resistor 38, and a Zener diode 40. It should be noted that the specific implementation of the voltage converter 34-1 may vary in various ways and may not limit the scope of the present invention in any way.

Further, according to the present invention the voltage converter may be a switched DC/DC converter, e.g., a buck converter, a boost converter or a buck-boost converter. According to the present invention the DC/DC converter is fed with the switched voltage $U_{SW}$ at the internal circuit node

26-1, i.e., a pre-converted signal having already a duty ratio of, e.g., 50:50. From this, switching losses may be reduced significantly compared to a case where the DC/DC converter is supplied with a dc input signal where conversion starts from a signal which is not pre-converted.

In the following, further embodiments of the present invention will be described with reference to FIGS. 7 and 8 where the multiple input multiple output conversion of the at least one alternating input signals is based on full bridge rectification.

Figure 7:
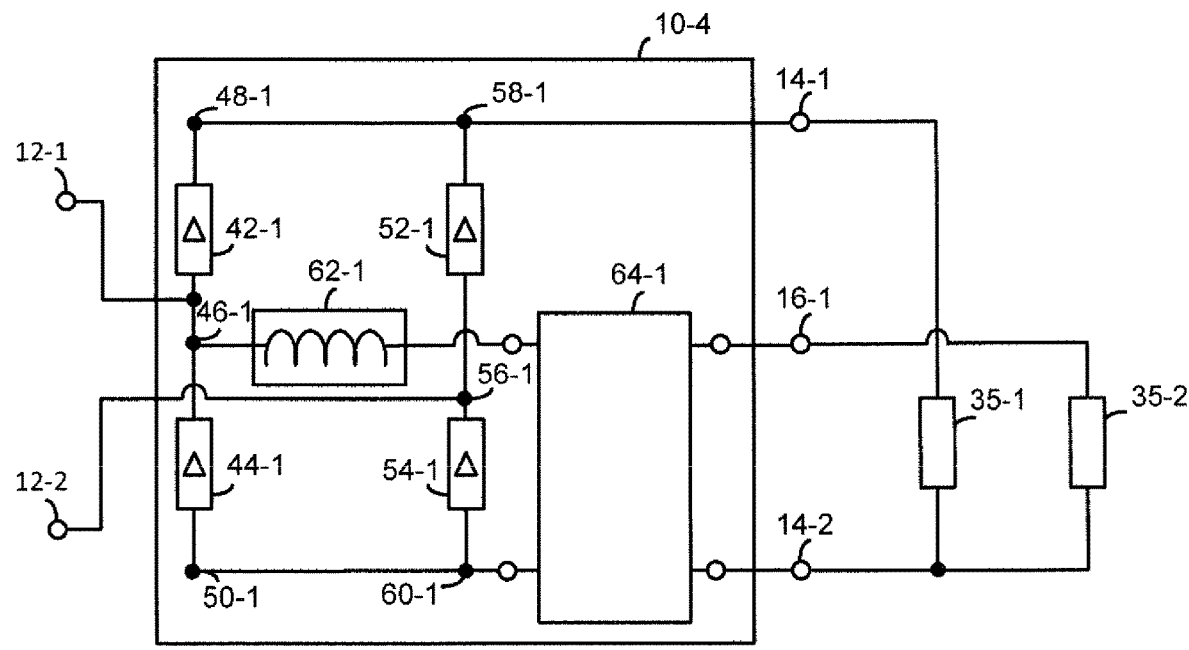
FIG. 7 shows a schematic diagram of a multiple input multiple output converter according to a fourth exemplary embodiment of the present invention.

FIG. 7 shows a schematic diagram of a multiple input multiple output converter 10-4 according to a fourth exemplary embodiment of the present invention.

As shown in FIG. 7, the multiple input multiple output converter 10-4 according the fourth embodiment of the present invention comprises a full bridge rectifier configuration set up from a first rectifier half-bridge and a second rectifier half-bridge.

As shown in FIG. 7, the first rectifier circuit is a first half bridge made up of a first rectifying circuit element 42-1 and a second rectifying circuit element 44-1 connected in series with each other. The first rectifying circuit element 42-1 and the second rectifying circuit element 44-1 form a first internal circuit node 46-1 between the first rectifying circuit element 42-1 and the second rectifying circuit element 42-1 as a rectifier input terminal of the first rectifier circuit connected to a first converter input terminal 12-1.

As shown in FIG. 7, the connection terminal of the first rectifying circuit element 42-1 remote from the first internal circuit node 46-1 forms a first half bridge output terminal 48-1 connected to a first converter output terminal 14-1 of the first converter output terminal group 14.

As shown in FIG. 7, the connection terminal of the second rectifying circuit element 44-1 remote from the first internal circuit node 46-1 forms a second half bridge output terminal 50-1 connected to the reference converter output terminal 14-2 of the first converter output terminal group 14.

As shown in FIG. 7, the second rectifier circuit is a second half bridge made up of a third rectifying circuit element 52-1 and a fourth rectifying circuit element 54-1 connected in series to each other. The third rectifying circuit element 52-1 and the fourth rectifying circuit element 54-1 form a second internal circuit node 56-1 between the third rectifying circuit element 52-1 and the fourth rectifying circuit element 54-1 as the rectifier input terminal of the second rectifier circuit connected to a second converter input terminal 12-2.

As shown in FIG. 7, the connection terminal of the third rectifying circuit element 52-1 remote from the second internal circuit node 56-1 forms a third half bridge output terminal 58-1 connected to a second converter output terminal 14-1, 14-2 in the first converter output terminal group 14. Generally, the second converter output terminal 14-1, 14-2 of the first converter output terminal group 14 being connected to the third half bridge output terminal 58-1 may be identical or different to the first converter output terminal 14-1 of the first converter output terminal group 14 being connected to the first half bridge output terminal 48-1.

As shown in FIG. 7, the connection terminal of the fourth rectifying circuit element 54-1 remote from the second internal circuit node 56-1 forms a fourth half bridge output terminal 60-1 connected to the reference converter output terminal 14-2 of the first converter output terminal group 14.

As shown in FIG. 7, the multiple input multiple output converter 10-4 according to the fourth embodiment of the present invention comprises an averaging circuit 62-1 having its first connection terminal connected to the first internal circuit node 46-1 of the first rectifier circuit and its second connection terminal connected to a related converter output terminal 16-1 of the second converter output terminal group 16. Alternatively, the first connection terminal of the averaging circuit 62-1 may be connected to the second internal circuit node 56-1 of the second rectifier circuit.

Operatively the full bridge rectifying circuit shown in FIG. 7 will achieve full wave rectification of an alternating input signal supplied at the multiple input multiple output converter input terminals 12-1, 12-2.

Further, operatively the averaging circuit 62-1 is adapted to average a switched voltage signal which is generated at the first internal circuit node 46-1 of the first rectifier circuit during rectification operation and to output the averaged switched voltage signal at the related converter output terminal 16-1 of the second converter output terminal group 16 during a period where the first rectifier circuit is blocking output of an alternating input signal to the first converter output terminal 14-1 of the first converter output terminal group 14. Alternatively, the switched voltage may be supplied to the averaging circuit 62-1 from the second internal circuit node 56-1.

As shown in FIG. 7, optionally the multiple input multiple output converter 10-4 according to the fourth embodiment of the present invention may comprise a voltage controller 64-1 being operatively adapted to vary a voltage level of an averaged switched voltage as output by the averaging circuit 62-1. Here, the same explanations as given above with respect to FIGS. 5 and 6 equally apply.

Figure 8:
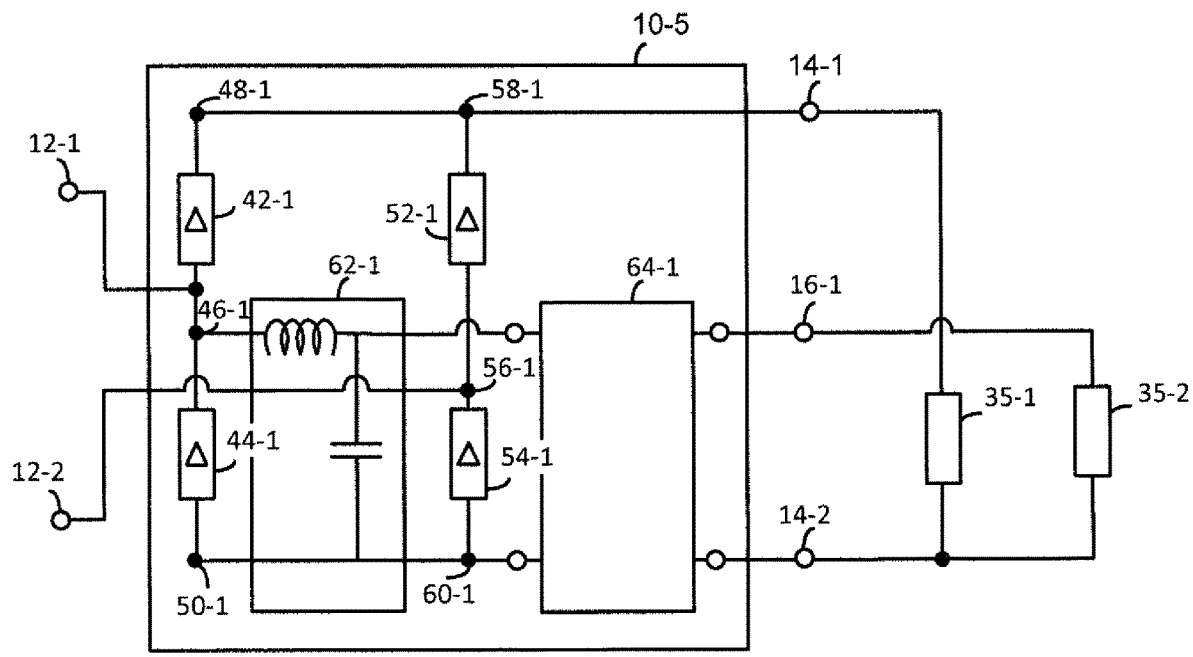
FIG. 8 shows a schematic diagram of a multiple input multiple output converter according to a fifth exemplary embodiment of the present invention.

FIG. 8 shows a schematic diagram of a multiple input multiple output converter 10-5 according to a fifth exemplary embodiment of the present invention.

The multiple input multiple output converter 10-5 according to the fifth exemplary embodiment of the present invention differs from the fourth exemplary embodiment in the structure of the averaging circuit 62-1.

As shown in FIG. 8, while in the fourth embodiment the averaging circuit 62-1 is realized by an inductive element, e.g., a coil, according to the fifth exemplary embodiment the averaging circuit 62-1 is realized as a low pass filter. Generally, it should be noted that according to the present invention the averaging circuit to be applied in combination with a full bridge rectification circuit topology is not restricted in any way as long as there is achieved a functionality to average a switched voltage of the first internal circuit node 46-1 or the second internal circuit node 56-1.

In the following, the application of the multiple input multiple output converter, according to the present invention, to supply power to at least one energy storage device and/or one load connected the converter output terminals will be explained.

Generally, the multiple input multiple output converters according to the present invention may be used in a power supply system for supply of electric power to a plurality of loads and/or energy storage devices.

According to the present invention, such a power supply system comprises a multiple input multiple output converter according to the present invention which is adapted to convert at least one alternating input signal into at least one rectified signal for output at the first output terminal group 14 and into at least one averaged voltage signal derived from a switched voltage signal generated during rectification of the at least one alternating input signal for output at a second output terminal group 16.

Further, according to the present invention at least one first energy storage device or first load 354 is connected to at least one output terminal 14-1 of the first output terminal group 14 and at least one second energy storage device or second load 35-2 is connected to at least one output terminal 16-1 of the second output terminal group 16 so as to balance the voltage of the at least one first energy storage device or first load 35-1 with respect to the voltage of the at least one second energy storage device or second load 35-2. It should be noted that according to the present invention the balancing also can occur when there is no input, i.e. when the rectifying circuit elements are actively switched.

Further, according to the present invention a plurality of second energy storage devices 35-2, . . . , 35-n may be connected to the output terminals of the second output terminal group 16 to balance voltage levels of the plurality of second energy storage devices 35-2, . . . , 35-n with respect to rated voltage levels of the plurality of second energy storage devices 35-2, . . . , 35-n.

Further, according to the present invention at least one first energy storage device or first load 35-11, 35-12, . . . may be connected to an output terminal 14-1 of the first output terminal group 14 and to an output terminal 16-1 of the second output terminal group 16 of the multiple input multiple output converter according to the present invention to balance the voltage level of the at least one first energy storage device or the at least one first load 35-11, 35-12, . . . with respect to related rated voltage levels of the at least one first energy storage device or the at least one first load 35-12, 35-12, . . . .

Figure 9:
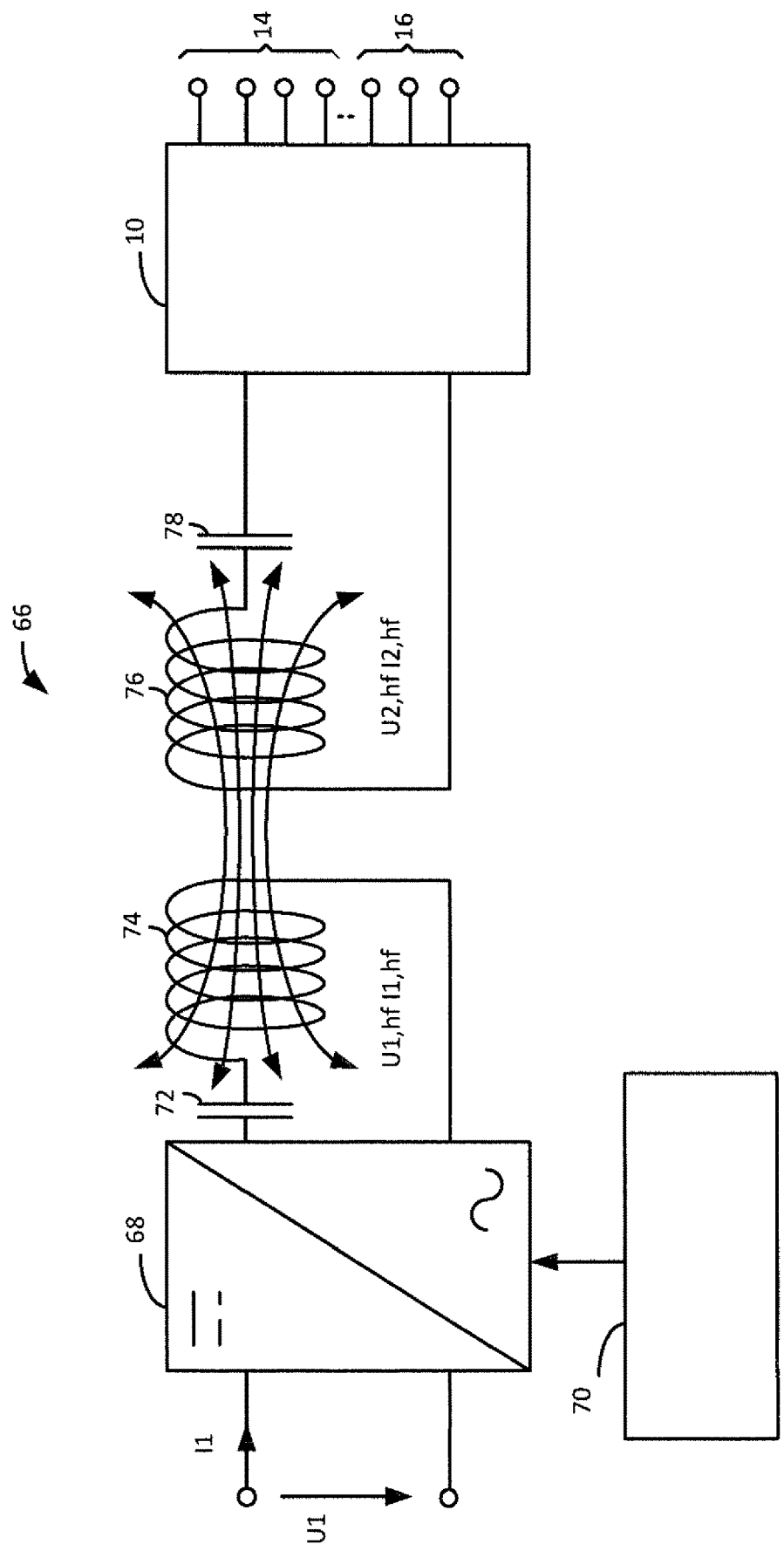
FIG. 9 shows a schematic diagram of a inductive power transfer system using the multiple input multiple output converter according to the present invention at the secondary side of the inductive power transfer system.

FIG. 9 shows a schematic diagram of an inductive power transfer system 66 using a multiple input multiple output converter according to the present invention at the secondary side thereof as an example of realization of the power supply system according to the present invention.

As shown in FIG. 9, the inductive power transfer system 66 has a primary side comprising a primary side DC/AC converter 68, a primary side controller 70, a primary side compensation capacitor 72, and a transmitter coil 74 connected in series to the primary side compensation capacitor 72. The series connection of the primary side compensation capacitor 72 and the transmitter coil 74 is connected to the outputs of the primary side DC/AC converter 68.

Operatively, the primary side DC/AC converter 68 is adapted to receive a primary side dc voltage and a primary side direct current as input and to convert it into a primary side high frequency voltage and a primary side high frequency current. The primary side high frequency voltage and the primary side high frequency current are then supplied to the series connection of the primary side compensation capacitor 72 and transmitter coil 74 for generation of an oscillating magnetic field.

As shown in FIG. 9, the inductive power transfer system 66 has a secondary side separated from the primary side comprising a receiver coil 76 connected in series to a secondary side compensation capacitor 78. Operatively, the receiver coil 76, when placed in the magnetic field produced by the transmitter coil 74, receives energy transmitted by the transmitter coil 74 through inductive coupling. The inductive coupling leads to generation of a secondary side high frequency voltage and a secondary side high frequency current.

As shown in FIG. 9, the secondary side also comprises the multiple input multiple output converter according to the present invention. At the input side of the multiple input multiple output converter 10, according to the present invention, there is the series connection of the receiver coil 76 and the secondary side compensation capacitor 78 for supply of the secondary side high frequency voltage and a secondary side high frequency current to the multiple input multiple output converter 10 according to the present invention.

Assuming series-series compensation of the inductive power transfer system the input signal to the multiple input multiple output converter can have current source characteristics as explained above with respect to FIG. 5. It should be noted that generally depending on the driving frequency/dimensioning of the components it is also possible to create a voltage source with series-series compensation.

As shown in FIG. 9, at the output side of the multiple input multiple output converter there may be connected at least one energy storage device and/or at least one load at converter output terminals of the first converter output terminal group 14 and of the second converter output terminal group 16.

Operatively, the multiple input multiple output converter according to the present invention is adapted to convert the alternating signal supplied by the series connection of the receiving coil 76 and the secondary side compensation capacitor 78 into at last one rectified output signal and into at least one averaged output signal for supply to at least one energy storage device and/or at least one load connected to output terminals of the first converter output terminal group 14 and of the second converter output terminal group 16 of the multiple input multiple output converter in the sense outlined above.

From the explanations given with respect to FIG. 9 it should be understood that the multiple input multiple output converter according to the present invention may be advantageously embedded and/or used in conductive and inductive charging systems for mobile robots, automated guided vehicles, and electric vehicles in general which require two or more voltage levels, power supplies in the telecommunication industry and/or data centers, inverters and/or converters for stationary energy storage devices, mobile phones or tablets or any other mobile device, and converters used in the production of chemicals such as hydrogen using hydrolysis. The wireless power transmission system may also be provided with power from solar cells, fuel cells, or motors. In should be noted that this list of applications given here is clearly not exhaustive and has no binding effect on the scope of the present invention.

In the following, more specific examples of connection topologies of the at least one energy storage device and the at least one load to output terminals of the first converter output terminal group 14 and of the second converter output terminal group 16 of the multiple input multiple output converter according to the present invention will be described with reference to FIG. 10 to FIG. 22.

Figure 10:
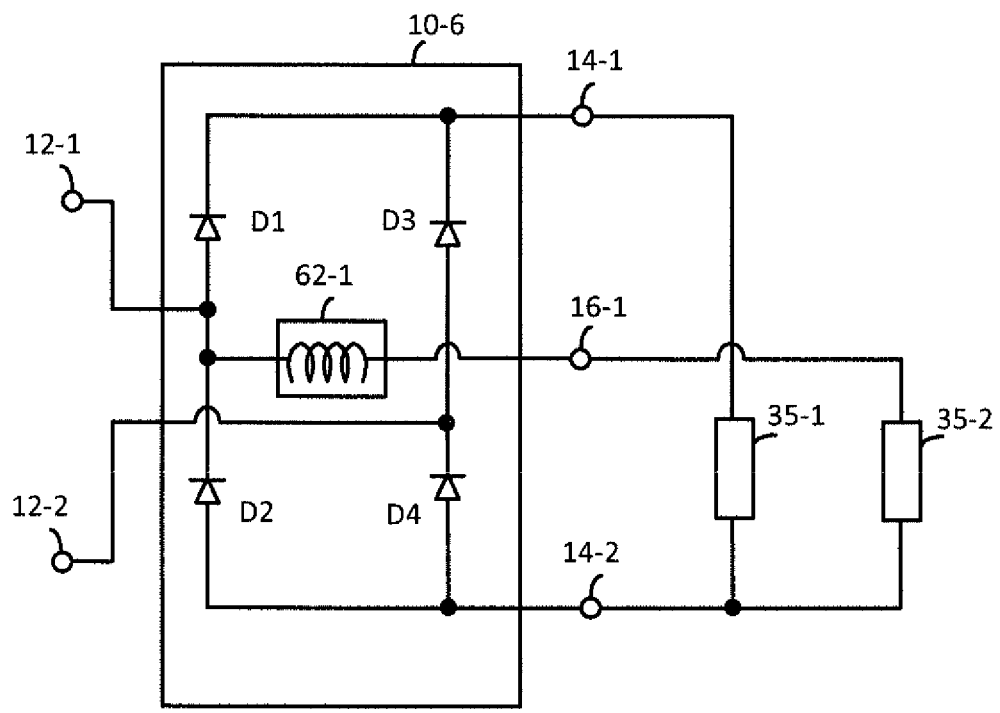
FIG. 10 shows a schematic diagram of a multiple input multiple output converter according to a sixth exemplary embodiment of the present invention.

FIG. 10 shows a schematic diagram of a multiple input multiple output converter 10-6 according to a sixth exemplary embodiment of the present invention.

As shown in FIG. 10, the multiple input multiple output converter 10-6 according to the sixth exemplary embodiment of the present invention has two converter input terminals 12-1, 12-2 and three converter output terminals 14-1, 14-2, 16-1. The multiple input multiple output converter 10-6 comprises four diodes $D_1$ to $D_4$ as rectifying circuit elements. One output terminal 14-2 of the first converter output terminal group constitutes a common reference of two energy storage devices or loads 35-1, 35-2 and the other output terminal 14-1 of the first converter output terminal group is connected to a first energy storage device or load 35-1.

Additionally, an averaging circuit 62-1, e.g., a coil or an inductor L, is connected to an internal circuit node between the two diodes D1 and D2 and to a converter output terminal 16-1 where a second energy storage device or second load 35-2 is connected.

As shown in FIG. 10, the first energy storage device or load 35-1 is connected to the converter output terminals 14-1 and 14-2, and the averaging circuit 62-1 is connected to the internal circuit node between the diodes D1 and D2 and to the second energy storage device or load 35-2 via the converter output terminal 16-2. The averaging circuit 62-1 may be the inductor L or alternatively an LC circuit having an inductor and a parallel circuit of a capacitor and load in series and/or an LC circuit having an inductor and capacitor in parallel.

As outlined above, the multiple input multiple output converter 10-6 has rectifying functionality and at the same time generates a switched square wave voltage which can be used to feed the averaging circuit 62-1. No further control circuitry is needed, as the natural switching behavior of the multiple input multiple output converter 10-6 is used to generate the switched voltage.

In more detail, an alternating current $I_{IN}$ is input to the multiple input multiple output converter 10-6. The alternating current $I_{IN}$ may a sinusoidal current, or alternatively have a triangular or rectangular shape or any other shape.

Further, during rectification, a switched voltage $U_{SW}$ is generated by the multiple input multiple output converter 10-6 at its internal circuit nodes. The switched square wave voltage $U_{SW}$ changes between a predetermined positive voltage value and zero. This means that the natural switching behavior of the multiple input multiple output converter 10-6 is used to generate the switched square wave voltage $U_{SW}$. The switched square wave voltage $U_{SW}$ is supplied to the averaging circuit 62-1 having an inductive behavior and the second energy storage device or load 35-2. Due to the inductive behavior of the averaging circuit 62-1 a current $I_L$ is generated, see also FIG. 5, which is fed to the second energy storage device or load 35-2. The predetermined positive voltage value may have a voltage value equal to or about or near to the value of the voltage U1 which is generated at the first energy storage device or load 35-1.

As outlined above, the voltage value of U2 may be one half of the voltage value U1 according to $U_2=U_1/2$. The current flowing into the first energy storage device or load 35-1 is dependent on the current difference $I_{IN}-I_L$ which flows through the diode bridge of the multiple input multiple output converter 10-6, wherein the current $I_L$ is determined by the load 35-2 which is connected to the inductive component L in series.

From the above, it should be understood that a part—i.e. one half-bridge consisting of two series connected diodes $D_1$, $D_2$ or active switches $Q_1$, $Q_2$—of the multiple input multiple output converter 10-6 serves as a rectifier and at the same time is used to provide an appropriate voltage to the second energy storage and/or load 35-2, as also explained above with respect to FIG. 4.

In conclusion, diodes D1 and 02 or active switches Q1 and Q2 fulfill two functions or expressed in other words, the diodes or active switches have double function.

Figure 11:
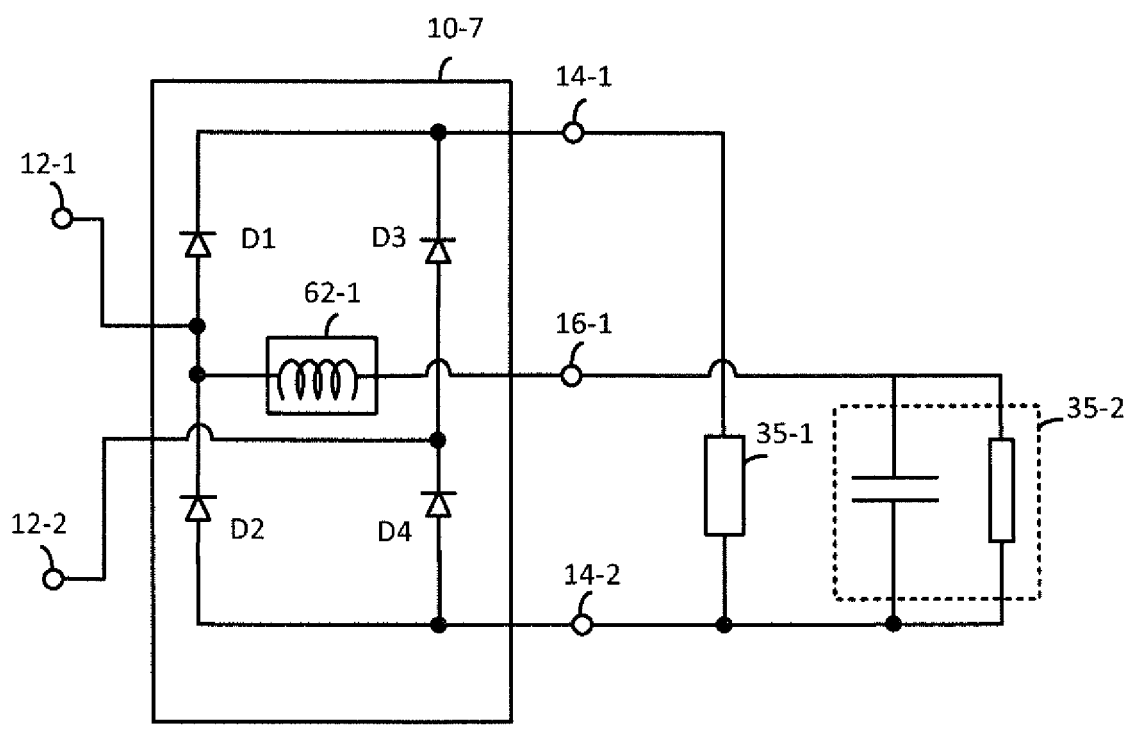
FIG. 11 shows a schematic diagram of a multiple input multiple output converter according to a seventh exemplary embodiment of the present invention.

FIG. 11 shows a schematic diagram of a multiple input multiple output converter 10-7 according to a seventh exemplary embodiment of the present invention.

As shown in FIG. 11, the multiple input multiple output converter 10-7 has the second energy storage device 35-2 shown in FIG. 10 replaced by a load having a capacitor connected in parallel. Alternatively, the first energy storage device may be replaced by a load.

Preferably, according to the present invention the load and the energy storage device are connected in parallel. The load may comprise a capacitor and a resistor. Also, an additional energy storage device or a load may be connected to the first energy storage device or load 35-1. Thus, two or more energy storage devices may be connected to the two output terminals 14-1 and 14-2 of the first converter output terminal group 14.

Figure 12:
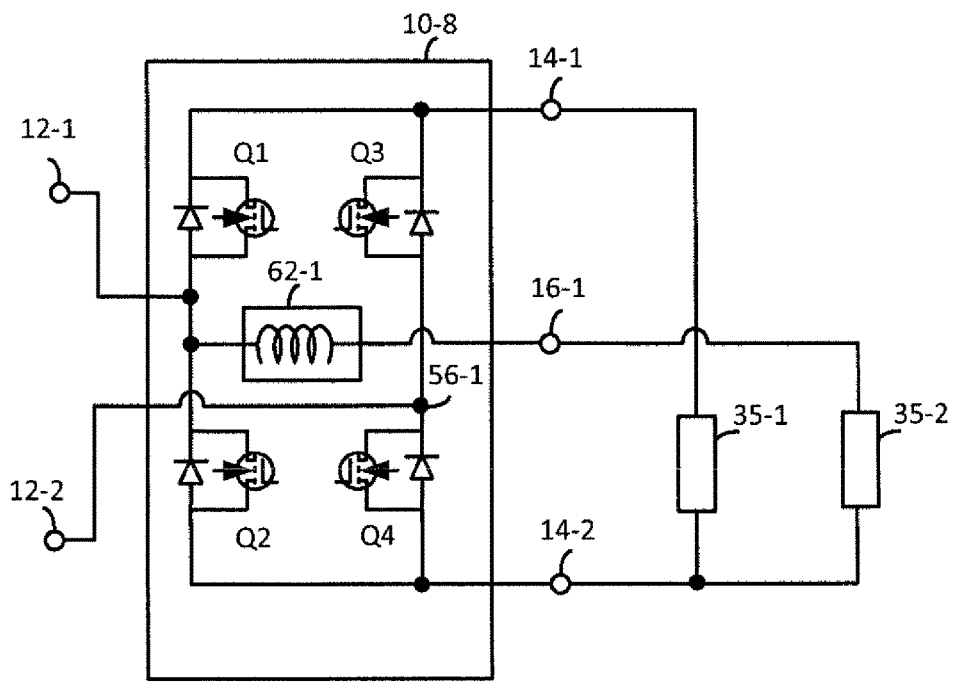
FIG. 12 shows a schematic diagram of a multiple input multiple output converter according to an eighth exemplary embodiment of the present invention.

FIG. 12 shows a schematic diagram of a multiple input multiple output converter 10-8 according to an eighth exemplary embodiment of the present invention.

As shown in FIG. 12, in the multiple input multiple output converter 10-8 according to the eighth exemplary embodiment of the present invention the rectifying circuit elements of the full bridge rectifier are active switches $Q_1$ to $Q_4$ to drive the rectifier as a synchronous rectifier. Here, the active switches $Q_1$ to $Q_4$ may be MOSFETs or GaN transistors or any other type of transistors.

Using active switches provides the advantage that the active switches $Q_1$ to $Q_4$ may be used for transferring the stored energy from one energy storage device to another energy storage device even if the alternating current $I_{IN}$ is zero. For example, the alternating current $I_{IN}$ is zero when there is no wireless inductive transmission of power in an inductive power transfer system or when there is no input alternating current supplied to the inductive power transfer system.

Preferably, the energy may be transferred from the first energy storage device or load to the second storage device or load 35-2 or from the second energy storage device or load 35-2 to the first storage device or load 35-1. The energy is transferred from the first energy storage device or load 35-1 to the second storage device or load 35-2 or from the second energy storage device or load 35-2 to the first storage device or load 35-1 using the energy buffering functionality of the averaging circuit 62-1.

Figure 12A:
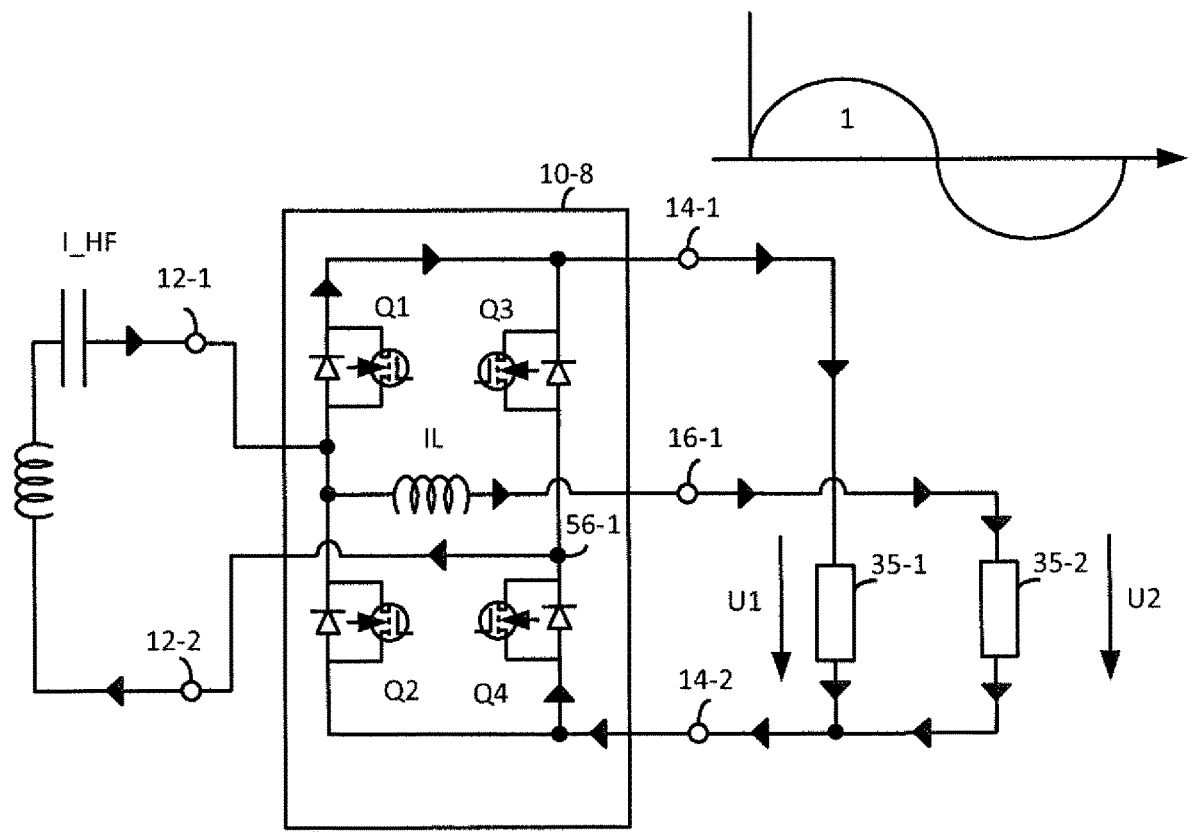
FIG. 12a shows a current flow in the multiple input multiple output converter shown in FIG. 12 in an operative state where electric power is supplied to secondary side of the inductive power transfer system and during a positive half wave of the secondary side high frequency current.

FIG. 12a shows a current flow in the multiple input multiple output converter shown in FIG. 12 in an operative state where electric power is supplied to secondary side of the inductive power transfer system and during a positive half wave of the secondary side high frequency current.

As shown in FIG. 12a, during the positive half wave of the secondary side high frequency current the input current divides into a first part flowing through the left branch of the full bridge rectifier to the output terminal 14-1, then into the first storage device or load 35-1 and then back over the lower right part of the full bridge rectifier. A second part of the input current flows into the coil to the output terminal 16-1, then to the second load 32-2 and then back over the lower right part of the full bridge rectifier.

Figure 12B:
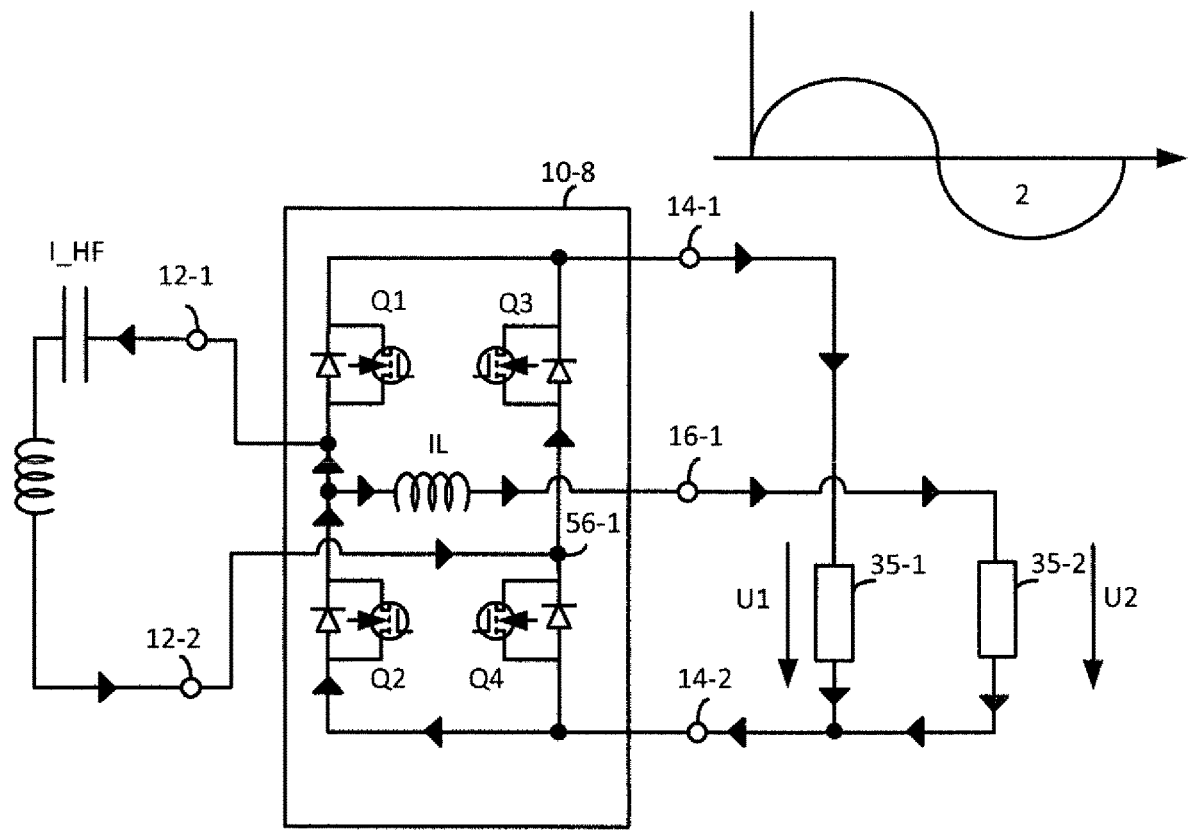
FIG. 12b shows a current flow in the multiple input multiple output converter shown in FIG. 12 in an operative state where electric power is supplied to secondary side of the inductive power transfer system and during a negative half wave of the secondary side high frequency current.

FIG. 12b shows a current flow in the multiple input multiple output converter shown in FIG. 12 in an operative state where electric power is supplied to secondary side of the inductive power transfer system and during a negative half wave of the secondary side high frequency current.

As shown in FIG. 12b, during the negative half wave of the secondary side high frequency current the input current flows through the right branch of the full bridge rectifier to the output terminal 14-1, then into the first storage device or load 35-1 and then back over the lower left part of the full bridge rectifier. At the circuit node where the coil is connected the left branch of the full bridge rectifier circuit the back current divides into a part flowing to the input terminal 12-1 and a part flowing into the coil, then to the second load and then back to the lower left part of the full bridge rectifier. The second part can be positive or negative depending on the size of the inductor and a specification of the other circuit elements.

Figure 12C:
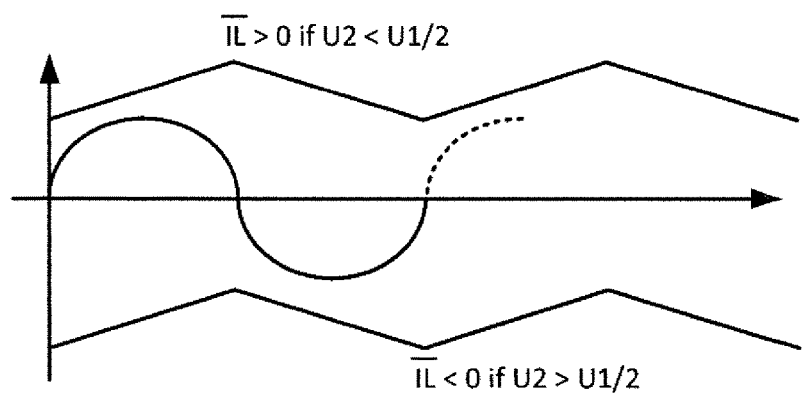
FIG. 12c shows an average of a current IL flowing through the coil shown in FIG. 12.

FIG. 12c shows current IL flowing through the coil realizing an averaging circuit shown in FIG. 12 according the operative sates shown in FIG. 12a and FIG. 12b.

As shown in FIG. 12c, the average of the current IL may either be larger or smaller than zero depending on the relation between the voltage $U_1$ at the first energy storage 35-1 and the voltage $U_2$ at the second load or energy storage 35-2.

As explained above, the currents shown in FIGS. 12a and 12b achieve a balancing of the voltage levels at the different connected energy storage devices with respect to rated voltage levels. The voltage ratio at the two output terminals 14-1 and 16-1 determines the duty cycle and magnitude of the voltage across the inductor 62-1 and thus the direction of the average current. This leads to the effect that the two voltages $U_1$ and $U_2$ tend to a balanced steady state of a ratio $U_1=U_2*2$.

Figure 12D:
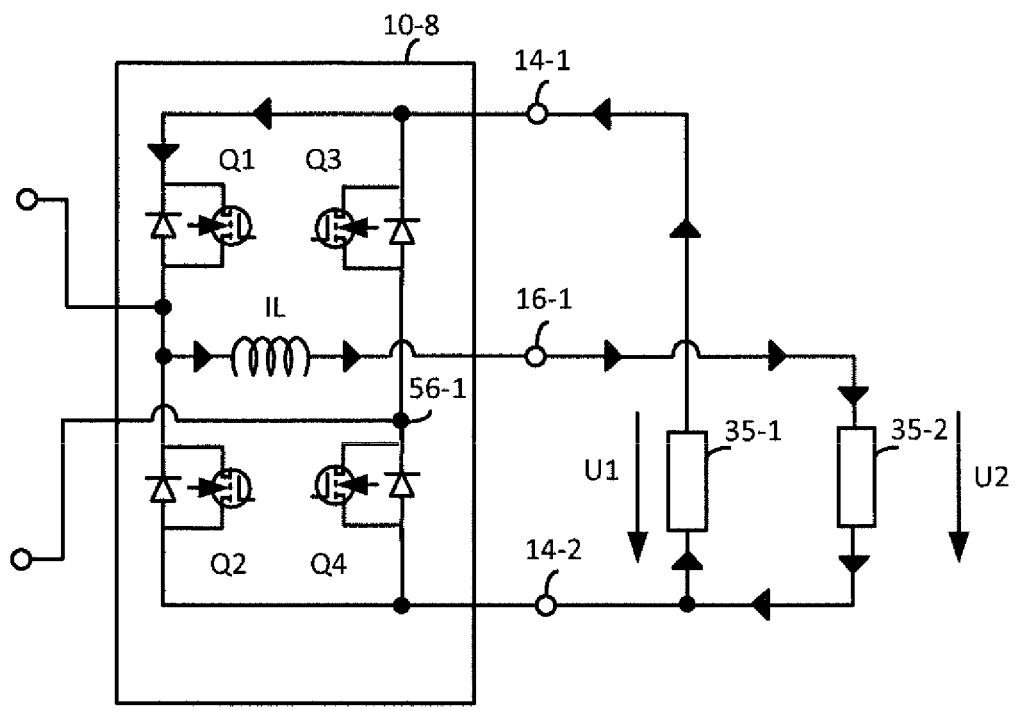
FIG. 12d shows a current flow in the multiple input multiple output converter shown in FIG. 12 in an operative state where electric power is not supplied to secondary side of the inductive power transfer system and where the upper active switch Q1 in the left branch of the full bridge circuit shown in FIG. 12 is activated.

FIG. 12d shows a current flow in the multiple input multiple output converter shown in FIG. 12 in an operative state where electric power is not supplied to secondary side of the inductive power transfer system and where the upper active switch $Q_1$ in the left branch of the full bridge rectifier circuit shown in FIG. 12 is activated. Here, one may assume that also the second load has energy storage characteristics, in more detail voltage source characteristics.

As shown in FIG. 12d, by closing the active switch $Q_1$ in the left branch of the full bridge rectifier circuit a current may flow from the first energy storage device 35-1, to the terminal 14-1, across the active switch into the coil, then to the output terminal 16-1 into the second load 35-2 and then back into the first energy storage device 35-1. This current flow leads to a transfer of energy from the first energy storage device 35-1 to the second load 35-2.

Figure 12E:
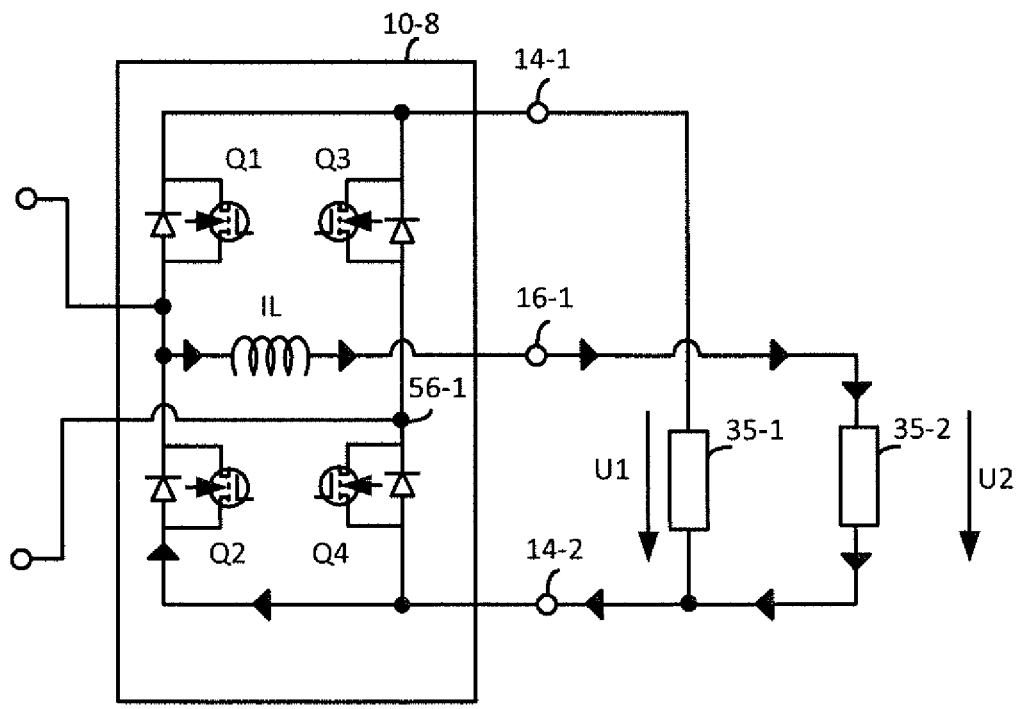
FIG. 12e shows a current flow in the multiple input multiple output converter shown in FIG. 12 in an operative state where electric power is not supplied to secondary side of the inductive power transfer system and where the lower active switch Q2 in the left branch of the full bridge circuit shown in FIG. 12 is activated.

FIG. 12e shows a current flow in the multiple input multiple output converter shown in FIG. 12 in an operative state where electric power is not supplied to secondary side of the inductive power transfer system and where the lower active switch $Q_2$ in the left branch of the full bridge rectifier circuit shown in FIG. 12 is activated.

As shown in FIG. 12e, when the lower active switch $Q_2$ in the left branch of the full bridge rectifier circuit is closed a current circulates in a loop constituted by the switch in the left branch of the full bridge rectifier circuit, the coil, and the second load 35-2.

Figure 12F:
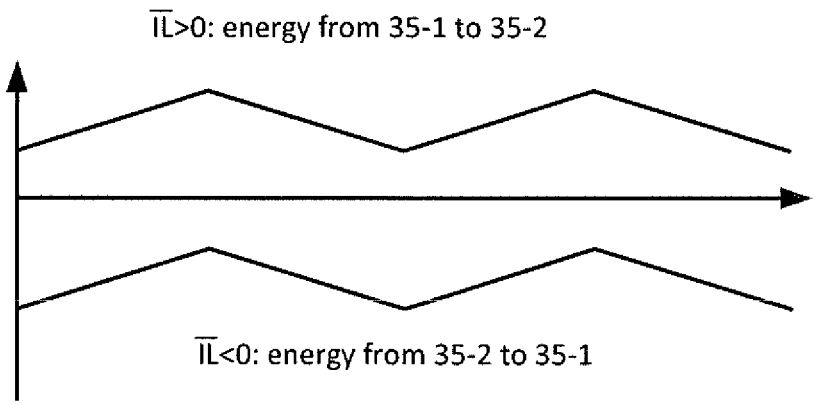
FIG. 12f shows an average of a current IL flowing through the coil shown in FIG. 12.

FIG. 12f shows an average of a current IL flowing through the averaging circuit shown in FIG. 12 according the operative sates shown in FIG. 12d and FIG. 12e.

Overall, the circuitry explained operates as a two quadrant converter. As shown in FIG. 12f, the averaged current may either have a value larger than zero or lower than zero. In the first case there occurs an energy transfer from the first energy storage device 35-1 to the second load or energy storage device 35-2 and otherwise the energy transfer is from the second load or energy storage device 35-2 to the first energy storage device 35-1d depending on the relationships between the two voltages $U_1$ and $U_2$ and the duty cycle of the on time of the active switches $Q_1$ and $Q_2$.

Figure 13:
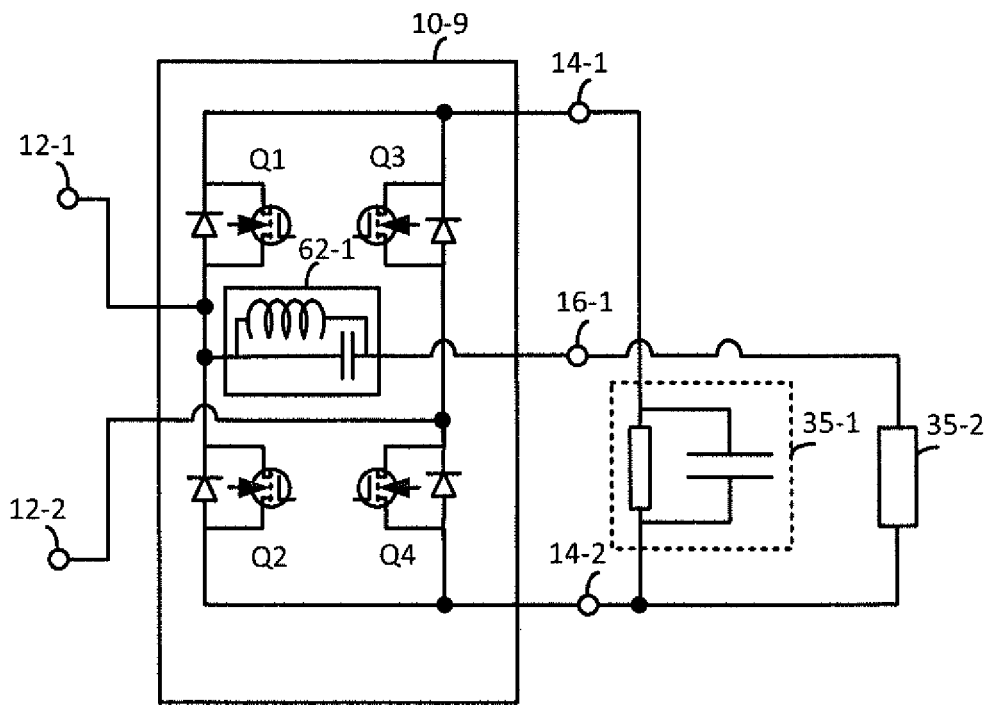
FIG. 13 shows a schematic diagram of a multiple input multiple output converter according to a ninth exemplary embodiment of the present invention.

FIG. 13 shows a schematic diagram of a multiple input multiple output converter 10-9 according to a ninth exemplary embodiment of the present invention.

A shown in FIG. 13, the multiple input multiple output converter 10-9 according to a ninth exemplary embodiment of the present invention differs from the eighth embodiment in that the first energy storage is replaced by a parallel circuit of a load and a capacitor and in that the averaging circuit 62-1 is realized by a LC parallel resonant circuit.

Figure 14:
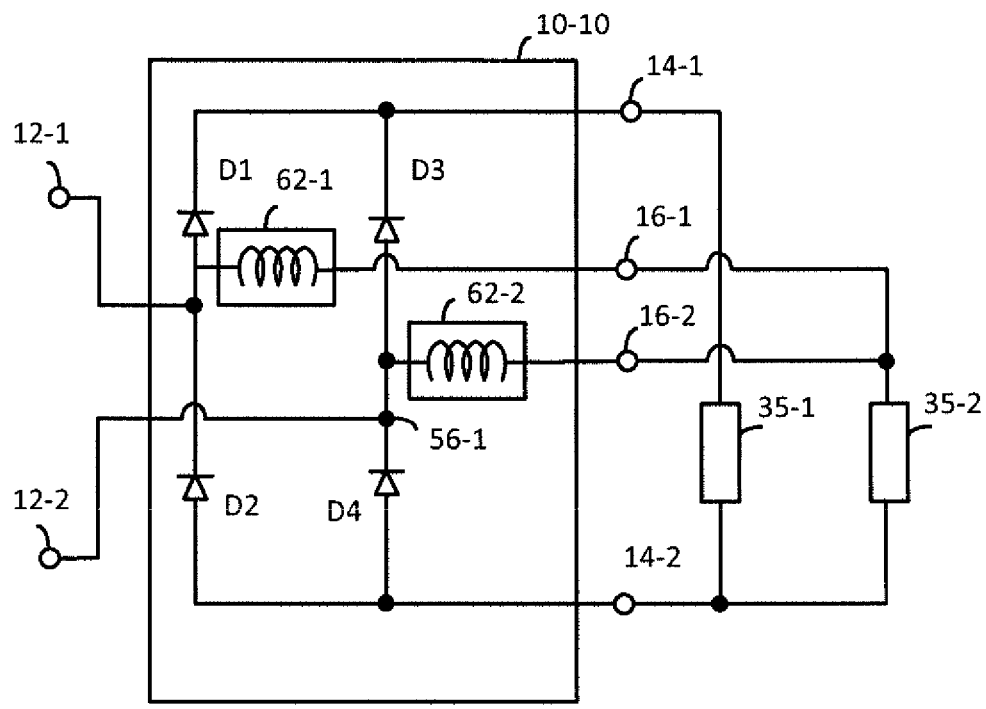
FIG. 14 shows a schematic diagram of a multiple input multiple output converter according to a tenth exemplary embodiment of the present invention.

FIG. 14 shows a schematic diagram of a multiple input multiple output converter 1040 according to a tenth exemplary embodiment of the present invention.

As shown in FIG. 14, multiple input multiple output converter 10-10 according to the tenth exemplary embodiment of the present invention comprises in addition to the first averaging circuit 62-1 a second averaging circuit 62-2.

As shown in FIG. 14, the second averaging circuit 62-2 has its first connection terminal connected to the second internal circuit node 56-1 of the second rectifier circuit and the second connection terminal connected to a second converter output terminal 16-2 of the second converter output terminal group 16.

Operatively, the second averaging circuit 62-2 is adapted to average a switched voltage which is generated at the second internal circuit node 56-1 of the second rectifier circuit during rectification operation.

Further, operatively the second averaging circuit 62-2 is adapted to output the averaged switched voltage at the second converter output terminal 16-2 of the second converter output terminal group 16 during a period where the second rectifier circuit is blocking output of an alternating input signal to the first converter output terminal 14-1 of the first converter output terminal group 14.

Figure 15:
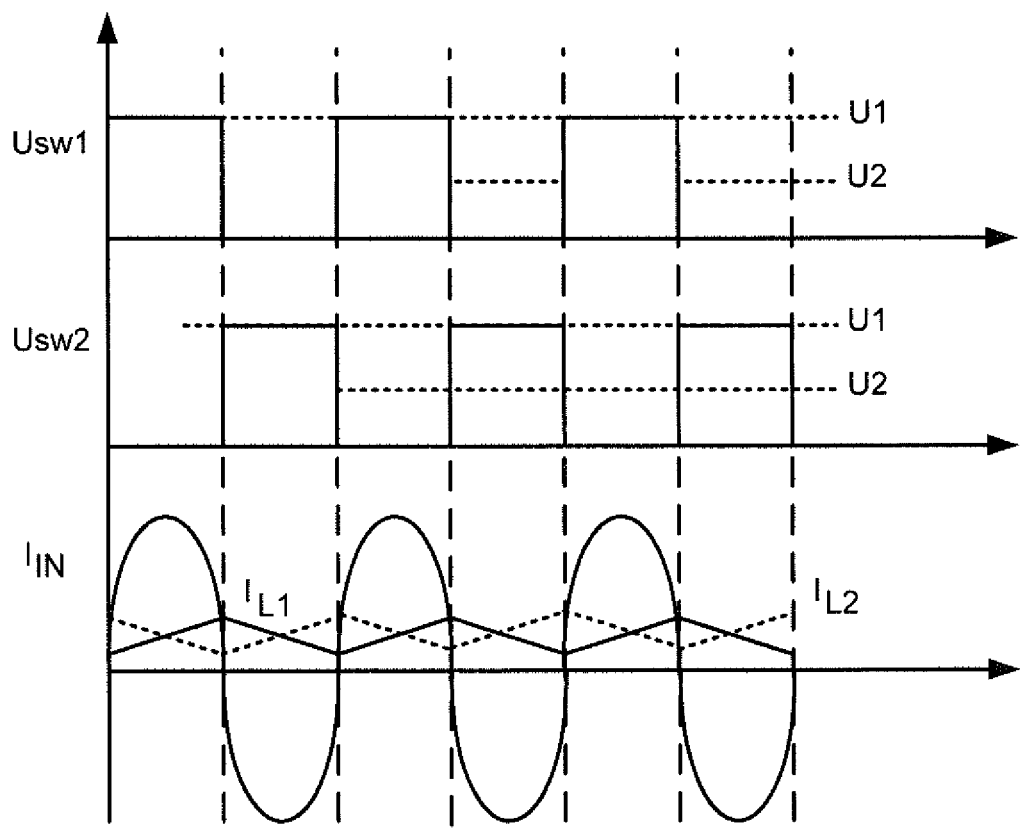
FIG. 15 shows signal characteristics of signals in the multiple input multiple output converter according to a tenth exemplary embodiment shown in FIG. 14.

FIG. 15 shows signal characteristics of signals in the multiple input multiple output converter 10-10 according to a tenth exemplary embodiment shown in FIG. 14.

A shown in FIG. 15, to the multiple input multiple output converter 10-10 according to the tenth exemplary embodiment an alternating current $I_{IN}$ is input to the input terminals 12-1 and 12-2. Preferably, the alternating current $I_{IN}$ is a sinusoidal current, or alternatively, the alternating current $I_{IN}$ has a triangular or rectangular shape or any AC waveform.

As shown in FIG. 15, two switched voltages $U_{SW1}$ and $U_{SW2}$ are generated by the rectifier, wherein each of the two switched voltages $U_{SW1}$ and $U_{SW2}$ changes between a predetermined positive voltage value and zero. This means that the natural switching behavior of the multiple input multiple output converter 10-10 is used to generate the two switched voltages $U_{SW1}$ and $U_{SW2}$.

Further, the switched voltage $U_{SW1}$ is supplied to the averaging circuit 62-1 and the second energy storage device or load 35-2 are connected in series to the averaging circuit 62-1. Additionally, the switched voltage $U_{SW2}$ is supplied to the further averaging circuit 62-2 and the second energy storage device or load 35-2 which are also connected in series to the further averaging circuit 62-2.

As shown in FIG. 15, due to the inductors in the averaging circuit 62-1 and the further averaging circuit 62-2, two currents $I_{L1}$ and $I_{L2}$ are generated which flow into the second energy storage device or load 35-2. The predetermined positive voltage value may have a voltage value equal to or about or near to one half of the value of the voltage $U_1$ which is generated at the first energy storage device or load 35-1. The voltage value of $U_2$ is preferably one half of the voltage value $U_1$, i.e. $U_2=U_1/2$.

As shown in FIG. 15, the voltage values $U_{SW1}$ and $U_{SW2}$ are shifted by 180 degrees such that the two currents $I_n$ and $I_{L2}$ are also shifted by 180 degrees.

Figure 16:
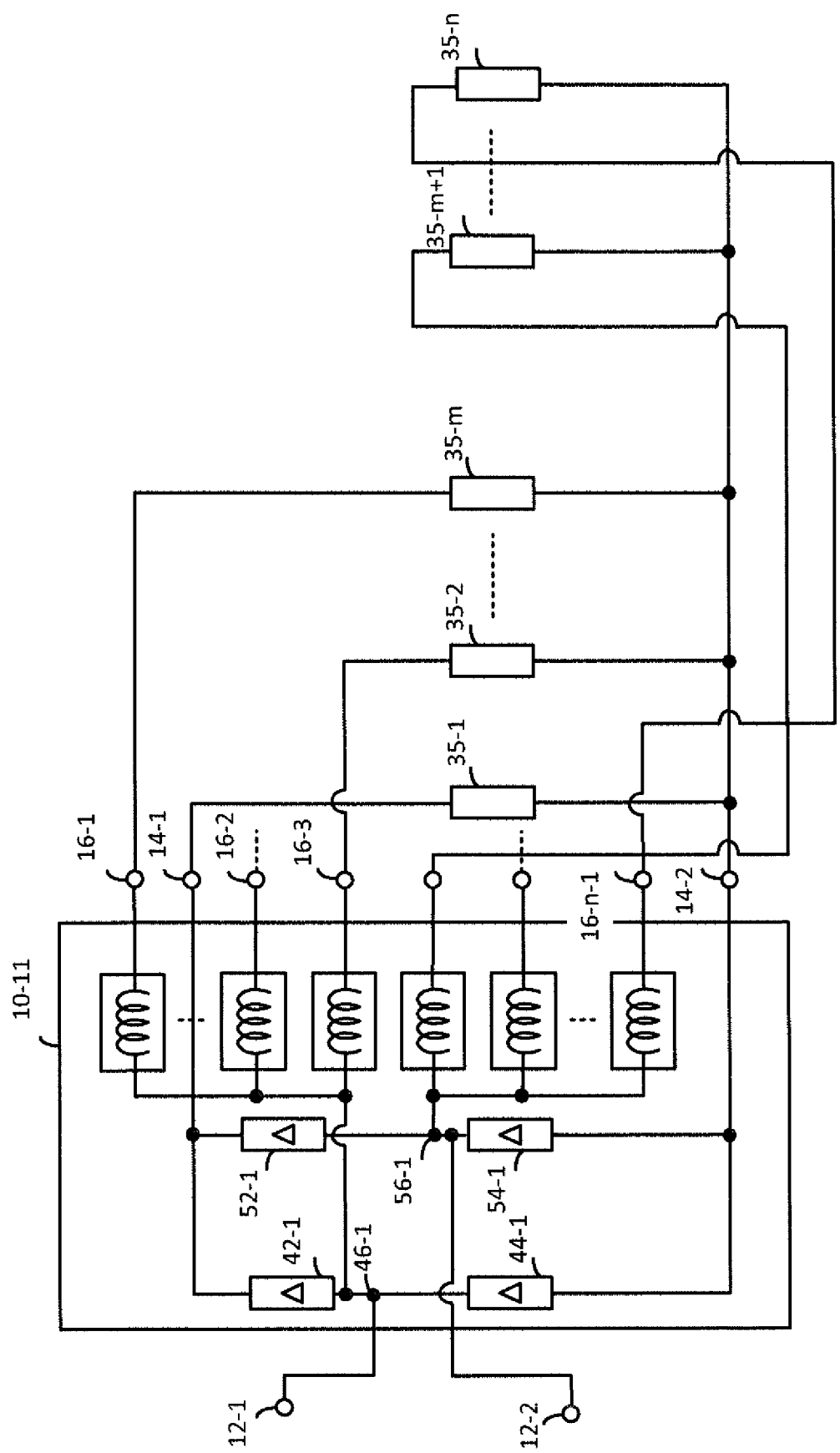
FIG. 16 shows a schematic diagram of a multiple input multiple output converter according to an eleventh exemplary embodiment of the present invention.

FIG. 16 shows a schematic diagram of a multiple input multiple output converter 10-11 according to an eleventh exemplary embodiment of the present invention.

As shown in FIG. 16, the multiple input multiple output converter 10-11 according to an eleventh exemplary embodiment of the present invention is connected to a plurality of energy storage devices or loads 35-1 to 35-n, n>2. It should be noted that one or more of the energy storage devices or loads may be replaced by a combination thereof.

As shown in FIG. 16, the multiple input multiple output converter 10-11 according to the eleventh exemplary embodiment comprises at least one averaging circuit provided for each of the plurality of energy storage devices or loads 35-2 to 35-$n$ connected to converter output terminals 16-1, . . . , 16-$m$ of the second converter output terminal group 16. Also, the first energy storage device or load 35-1 is connected to the converter output terminals 14-1, 14-2 of the first converter output terminal group 14. The latter converter output terminal 14-2 is also a reference terminal for the remaining energy storage devices or loads 35-2, . . . , 35-$n$.

Preferably, the averaging circuits may comprise inductors having different inductances or at least two of the averaging circuits comprise different inductors having different inductances. It should be noted that stored energy can be transferred from one energy storage device to another energy storage device. If the rectifying circuit elements 42-1, 44-1, 52-1, 54-1, are active switches $Q_1$ to $Q_4$, used in the multiple input multiple output converter 10-11 then energy can be transferred between energy storage devices when the input current is zero.

As shown in FIG. 16, in the multiple input multiple output converter 10-11, the averaging circuits connected to the first intermediate circuit node 46-1 feed a first group of energy storage devices or loads 35-2, . . . , 35-$m$ and the averaging circuits connected to the second internal circuit node 56-1 feed a second group of energy storage devices or loads 35-$m$+1, . . . , 35-$n$.

Operatively, the voltage levels available at the output terminals of the averaging circuits serve to balance the voltage levels of the energy storage devices or loads 35-2, . . . , 35-$n$ with respect to corresponding rated voltage levels.

Figure 17:
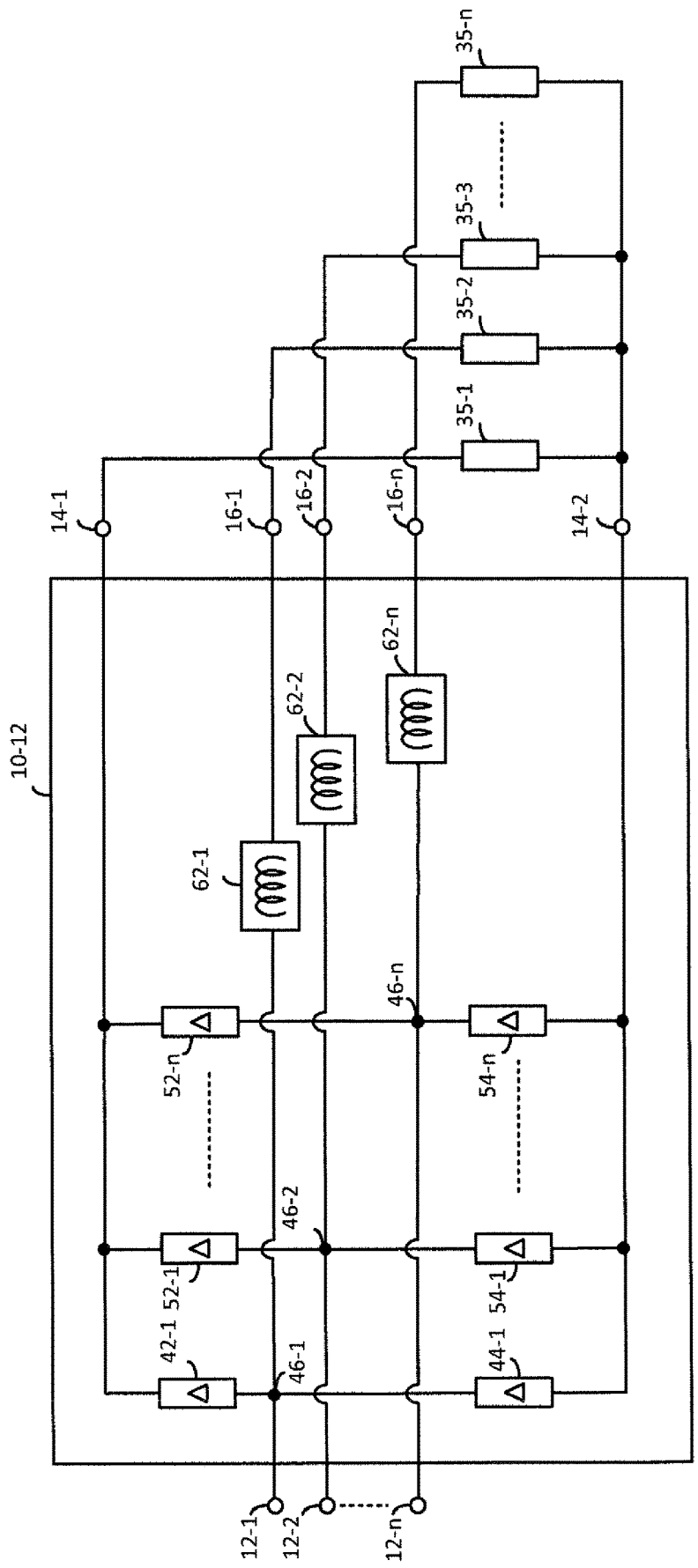
FIG. 17 shows a schematic diagram of a multiple input multiple output converter according to a twelfth exemplary embodiment of the present invention.

FIG. 17 shows a schematic diagram of a multiple input multiple output converter 10-12 according to a twelfth exemplary embodiment of the present invention.

As shown in FIG. 17, the multiple input multiple output converter 10-12 according to the twelfth exemplary embodiment is adapted to handle an N phase rectification scenario for a plurality of connected energy storage devices or loads 35-1, . . . , 35-$n$. It should be noted that at least one of the energy storage devices or loads 35-1, . . . , 35-$n$ may be replaced by a combination thereof.

As shown in FIG. 17, in the multiple input multiple output converter 10-12 according to the twelfth exemplary embodiment there is provided a half bride rectifier per phase, i.e., a first half bridge rectifier circuit 42-1, 44-1, for the first phase, a second half bridge rectifier circuit 52-1, 54-1 for the second phase, etc.

As shown in FIG. 17, a first averaging circuit 62-1 may be connected to the first internal circuit node 46-1 and a first output terminal of the second converter output terminal group 16, and a second averaging circuit 62-2 may be connected to the second internal circuit node 46-2 and a second converter output terminal 16-2 in the second converter output terminal group, etc.

As shown in FIG. 17, in the multiple input multiple output converter 10-12 according to the twelfth exemplary embodiment the first energy storage device or load 35-1 is connected to the output terminals 14-1, 14-2 of the first converter output terminal group, 14 and the further energy storage devices or loads 35-2, . . . , 35-$n$ may be connected to the converter output terminals 16-1, 16-2 of the second converter output terminal group 16 in parallel.

Operatively, the voltage levels available at the output terminals of the averaging circuits serve to balance the voltage levels of the energy storage devices or loads 35-2, . . . , 35-$n$ with respect to corresponding rated voltage levels so as to stabilize the operation of the complete system.

Figure 18:
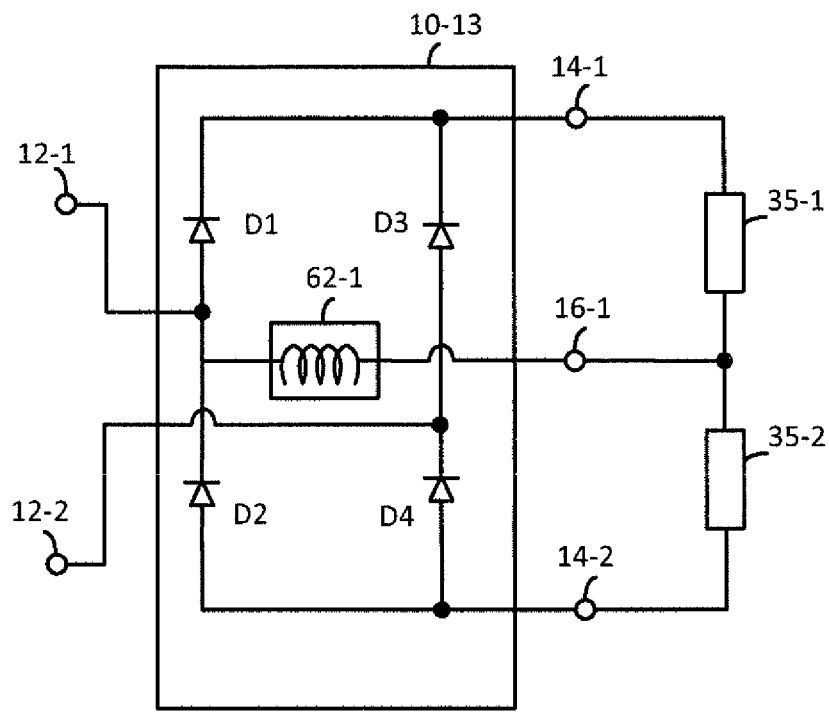
FIG. 18 shows a schematic diagram of a multiple input multiple output converter according to a thirteenth exemplary embodiment of the present invention.

FIG. 18 shows a schematic diagram of a multiple input multiple output converter 10-13 according to a thirteenth exemplary embodiment of the present invention.

As shown in FIG. 18, the multiple input multiple output converter 10-13 according to the thirteenth exemplary embodiment is similar to the multiple input multiple output converter 10-10 according to the tenth embodiment shown in FIG. 10, however, uses a different connection topology with respect to the connection of at least one energy storage device and/or at least one load.

As shown in FIG. 18, the multiple input multiple output converter 10-13 according to the thirteenth exemplary embodiment has a series connection of a first energy storage or load 35-1 and of a second energy storage or load 35-2 connected to the output terminals 14-1, 14-2 of the full wave rectifier bridge D1 to D4 and further has the output terminal 16-1 of the averaging circuit 62-1 connected to the intermediate node between the first energy storage device or load 35-1 and the second energy storage device or load 35-2. It should be noted that at least one energy storage device or load may be replaced by a combination thereof.

Operatively, the output of the averaging circuit 62-1 balances the intermediate voltage level existing at the connection node of the first energy storage device or load 35-1 and the second energy storage device or load 35-2, e.g., such that this voltage level is half of the voltage level across the complete series connection of the first energy storage device or load 35-1 and the second energy storage device or load 35-2 assuming that the switched voltage Usw has a 50% duty cycle.

Figure 19:
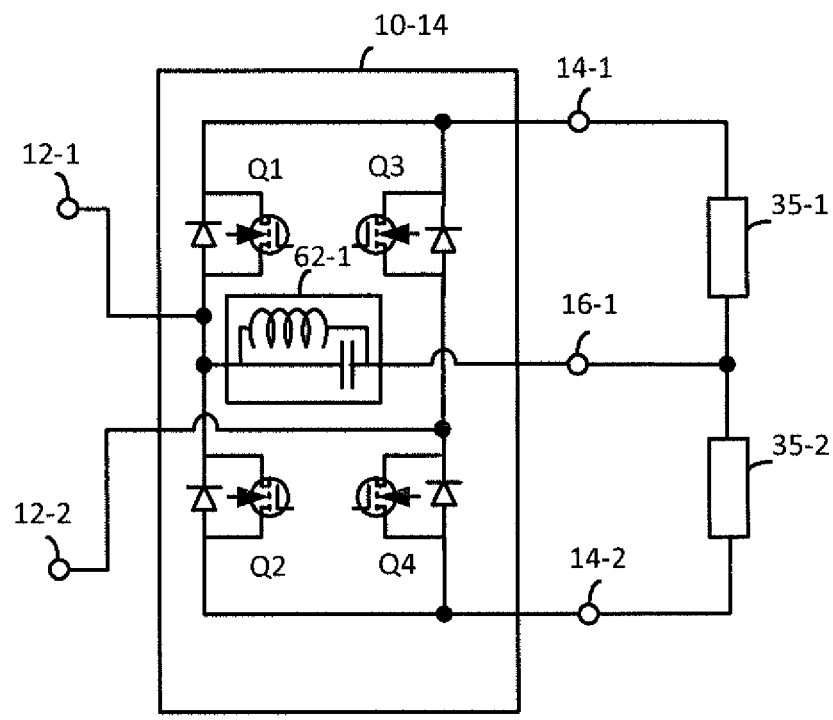
FIG. 19 shows a schematic diagram of a multiple input multiple output converter according to a fourteenth exemplary embodiment of the present invention.

FIG. 19 shows a schematic diagram of a multiple input multiple output converter 10-14 according to a fourteenth exemplary embodiment of the present invention.

The multiple input multiple output converter 10-14 according to a fourteenth exemplary embodiment is a modification of the thirteenth embodiment in that active switches $Q_1$ to $Q_4$ are used instead of diodes and in that the averaging circuit 62-1 is constructed with a parallel resonant LC circuit.

As outlined above, operatively active switches $Q_1$ to $Q_4$ provide the advantage that they may be used for transferring the stored energy from one energy storage device to another energy storage device even when the alternating current $I_{IN}$ is zero.

For example, the alternating current $I_{IN}$ is zero when there is no wireless inductive transmission of power in the wireless power transfer system explained with respect to FIG. 9 or if there is no alternating input current to the wireless power transfer system.

Preferably, the energy may be transferred from the first energy storage device or load 35-1 to the second storage device or load 35-2 or from the second energy storage device or load 35-2 to the first storage device or load 35-1. The energy is transferred from the first energy storage device or load 35-1 to the second energy storage device 35-2 or from the second energy storage device or load 35-2 to the first energy storage device or load 35-1 using, e.g., the averaging circuit 62-1.

It should be noted that the first energy storage device or load 35-1 and/or the second energy storage device or load 35-2 may be replaced by a combination thereof. Alternatively, every load can comprise an energy storage device or may comprise an energy storage device and a further load. Preferably, the load and the energy storage device are connected in parallel. The load may also comprise a capacitor and a resistor. Further, a further energy storage device or a load may be connected to the first energy storage device or load 35-1. Thus, two or more energy storage devices may be connected to the one of the two output terminals 14-1 and 14-2 in parallel or in series.

Figure 20:
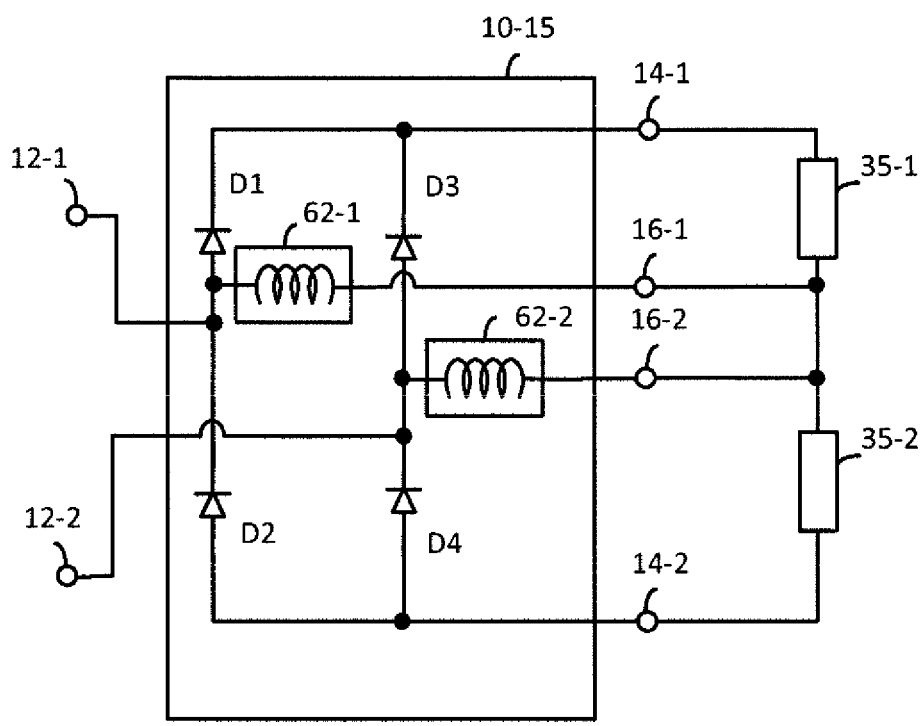
FIG. 20 shows a schematic diagram of a multiple input multiple output converter according to a fifteenth exemplary embodiment of the present invention.

FIG. 20 shows a schematic diagram of a multiple input multiple output converter 10-15 according to a fifteenth exemplary embodiment of the present invention.

As shown in FIG. 20 the multiple input multiple output converter 10-15 according to the fifteenth exemplary embodiment is a modification of the fourteenth exemplary embodiment in that a second averaging circuit 62-2 is connected to the internal circuit node between diode D3 and diode D4 and the intermediate connection node of the first energy storage device or load 35-1 and the second energy storage device or load 35-2.

Operatively, the provision of a second averaging circuit 62-2 in the multiple input multiple output converter 10-15 according to a fifteenth exemplary embodiment enhances voltage level balancing capability.

Figure 21:
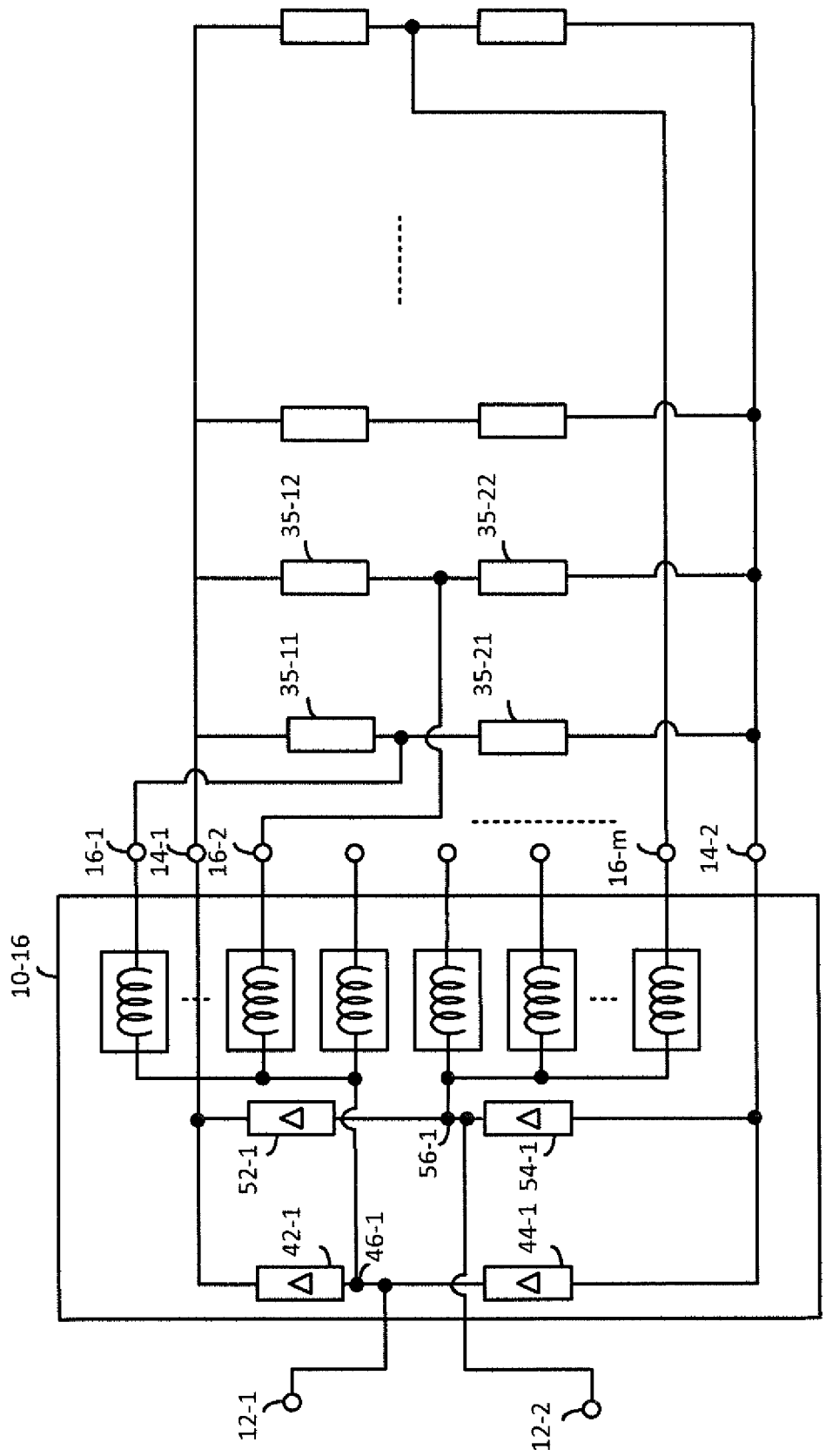
FIG. 21 shows a schematic diagram of a multiple input multiple output converter according to a sixteenth exemplary embodiment of the present invention.

FIG. 21 shows a schematic diagram of a multiple input multiple output converter 10-16 according to a sixteenth exemplary embodiment of the present invention.

As shown in FIG. 21, the multiple input multiple output converter 10-16 according to the sixteenth exemplary embodiment is a modification of the eleventh exemplary embodiment explained with respect to FIG. 16. Here the modification is that a plurality of series circuits each set up from serially connected first energy storage devices or loads 35-11, 35-12, ..., and second energy storage devices or loads 35-21, 35-22, ... are connected to the converter terminal outputs 14-1, 14-2 of the first converter terminal output group 14.

As shown in FIG. 21, to achieve voltage level balancing the multiple input multiple output converter 10-16 according to the sixteenth exemplary embodiment is provided with an averaging circuit and related converter output terminals 16-1, ..., 16-m for each series circuit. Preferably, the averaging circuits may have inductors having different inductances or at least two of the averaging circuits comprise different inductors having different inductances.

Further, it should be noted that in the multiple input multiple output converter 10-16 according to the sixteenth exemplary embodiment, when active switches $Q_1$ to $Q_4$ are used, energy stored in the energy storage devices may be transferred from one energy storage device to another energy storage device, even when the alternating current $I_{IN}$ is zero.

Figure 22:
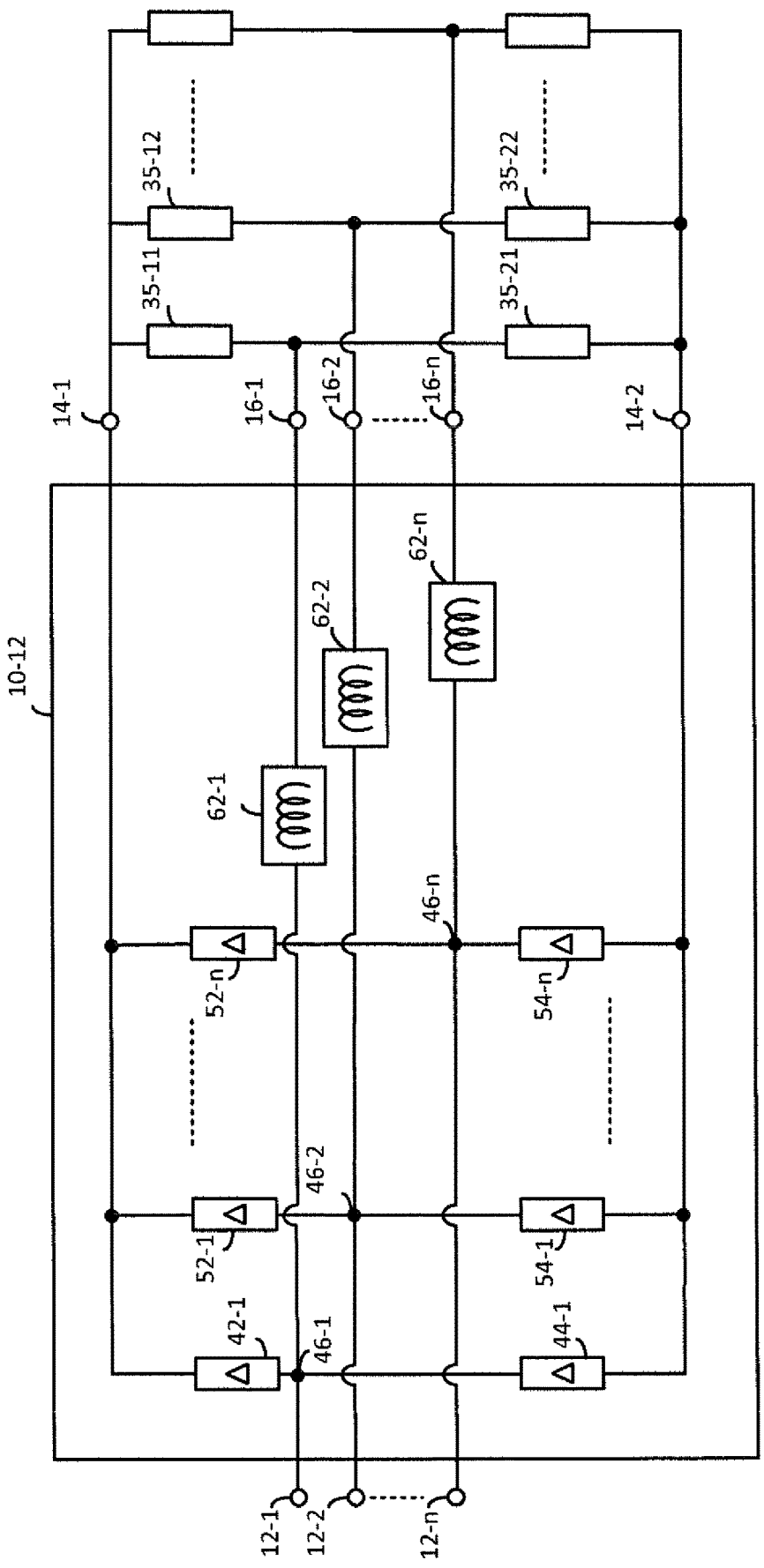
FIG. 22 shows a schematic diagram of a multiple input multiple output converter according to a seventeenth exemplary embodiment of the present invention.
Figure 23:
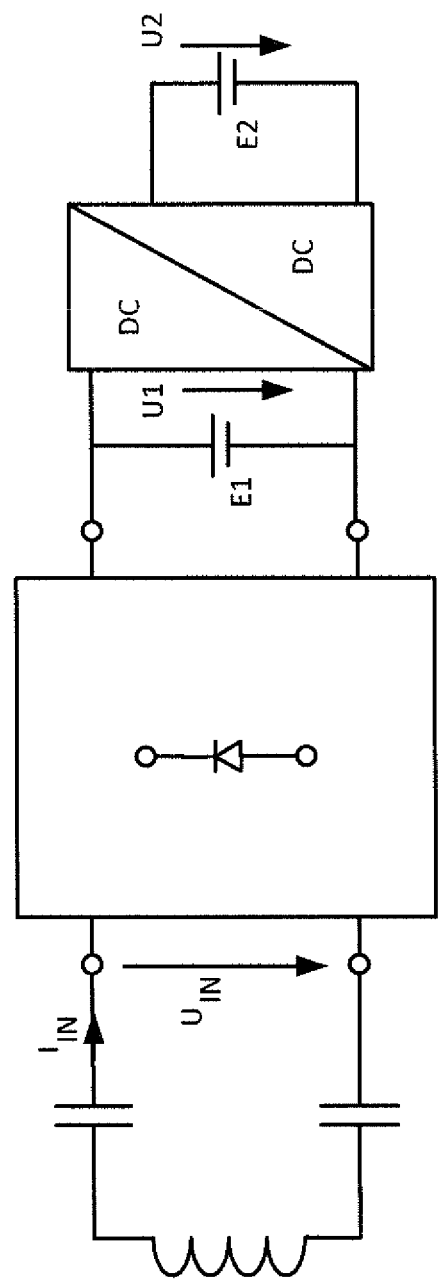
FIG. 23 shows a schematic diagram of a secondary side of an inductive power transfer system known in the art.

FIG. 22 shows a schematic diagram of a multiple input multiple output converter 10-17 according to a seventeenth exemplary embodiment of the present invention.

A shown in FIG. 22, the multiple input multiple output converter 10-17 according to the seventeenth exemplary embodiment is a modification of the twelfth embodiment explained with respect to FIG. 17.

As shown in FIG. 22, the multiple input multiple output converter 10-17 according to the seventeenth exemplary embodiment is adapted to multi-phase operation using one half bridge rectifier per phase.

As shown in FIG. 22, for each phase the multiple input multiple output converter 10-17 comprises one input terminals 12-1, 12-2, 12-3, 12-4, ... connected to the different half bridge rectifies, e.g., the first half bridge rectifier 42-1, 44-1, the second half bridge rectifier 52-1, 54-1, ..., up to the nth half bridge rectifier 52-n, 54-n. Further, the different phases of the multi-phase input signal will generally be phase shifted with respect to each other.

Generally, a specific example would be to have three phases with no neutral to a total of three half bridges. As alternative according to the present invention another option is three phases with neutral. In the latter case one may also connect three full bridges.

As shown in FIG. 22, while the multiple input multiple output converter 1047 according to the seventeenth exemplary embodiment is similar to the twelfth embodiment of the present invention there is a difference in the connectivity at the output side. Here, n series connections of first energy storage devices or loads 35-11, 35-12, ... and second energy storage devices or loads 35-21, 35-22, ... are connected to converter output terminals 14-1, 14-2 of the first converter terminal output group. Then for each series connection there is provided a dedicated averaging circuit 62-1, ..., 62-n connected to intermediate nodes of the series connections via related converter output terminals 16-1, 16-2, ..., 16-n of the second converter output terminal group 16.

Operatively, the use of multi-phase enhances the capability to operate at higher levels of power at the secondary side of the multiple input multiple output converter 10-17 according to a seventeenth exemplary embodiment.

While above the present invention has been described with reference to the drawing and figures, it should be noted that clearly the present invention may also be implemented using variations and modifications thereof which will be apparent and can be readily made by those skilled in the art without departing from the scope and spirit of the present invention. E.g., functionalities described above may be realized in software, in hardware, or a combination thereof.

Accordingly, it is not intended that the scope of claims appended hereto is limited to the description as set forth herein, but rather that the claims should be construed so as to encompass all features of presentable novelty that preside in the present invention, including all features that would be treated as equivalent thereof by those skilled in the art to which the present invention pertains.

The invention claimed is:

1. Secondary side of an inductive power supply system for supply of electric power to at least one load and/or at least one energy storage device having voltage source characteristics, comprising:
    (a) a series connection of a secondary receiver coil and a secondary side compensation capacitor being separated from the primary side of the inductive power supply system adapted to receive of energy transmitted from a transmitter coil of the inductive power supply system through inductive coupling and adapted to generate a secondary side high frequency current having current source characteristics,
    (b) a multiple input multiple output converter connected to the series connection of the receiver coil and the compensation capacitor and adapted to convert the secondary side high frequency current into at least one signal having first rectified signal characteristics and at least one signal having second averaged signal characteristics being different from the first rectified signal characteristics, the multiple input multiple output converter having
        (b1) a plurality of converter input terminals for input of the secondary side high frequency current the multiple input multiple output converter;
        (b2) a plurality of converter output terminals separated into a first converter output terminal group for output of the signal having the first rectified signal characteristics and a second converter output terminal group for output of the signal having the second averaged signal characteristics;
- (b3) at least one rectifier circuit adapted to rectify the secondary side high frequency current, wherein the at least one rectifier circuit has a rectifier input terminal connected to a related converter input terminal and a rectifier output terminal connected to a related converter output terminal of the first converter output terminal group for output of a rectified secondary side high frequency current as a signal having the first rectified signal characteristics;
- (b4) at least one averaging circuit adapted to average a switched square wave voltage which is generated during rectification at an internal circuit node of the at least one rectifier circuit during rectification operation, wherein the at least one averaging circuit has a first input terminal connected to the internal circuit node of the at least one rectifier circuit and a second output terminal connected to a related converter output terminal of the second converter output terminal group for output of an averaged switched voltage as a signal having the second signal characteristics;
- (c) at least one energy storing device being connected to the first converter output terminal group and having voltage source characteristics; and
- (d) a load or at least one further energy storing device connected to the second converter output terminal group.

2. Secondary side of an inductive power supply system according to claim 1, wherein in the multiple input multiple output converter the at least one rectifier circuit comprises at least one half bridge set up from a pair of an upper rectifying circuit element and of a lower rectifying circuit element connected in series to each other so as to form an internal circuit node between the upper rectifying circuit element and the lower rectifying circuit element;
form an upper half bridge output terminal at the upper rectifying circuit element as a rectifier output terminal connected to a related converter output terminal of the first converter output terminal group for output of a rectified alternating input signal as a signal having the first signal characteristics;
form a second half bridge output terminal at the lower rectifying circuit element as a further rectifier output terminal connected to a reference converter output terminal of the first converter output terminal group.

3. Secondary side of an inductive power supply system according to claim 2, wherein in the multiple input multiple output converter the at least one averaging circuit has its first connection terminal connected to the internal circuit node of an associated rectifier circuit and its second connection terminal connected to a related converter output terminal of the second converter output terminal group;
wherein the averaging circuit is adapted to average a switched square wave voltage which is generated during rectification at the internal circuit node of the associated rectifier circuit during rectification operation;
and to output an averaged switched square wave voltage which is the average between the voltage at the internal circuit node when the upper rectifying circuit element is conducting and the voltage at the internal circuit node when the lower circuit element is conducting, at the related converter output terminal of the second converter output terminal group as a signal having the second signal characteristics.

4. Secondary side of an inductive power supply system according to claim 3, the multiple input multiple output converter comprises at least one voltage converter adapted to vary the voltage level of an averaged switched voltage which is generated by an averaging circuit, wherein the at least one voltage converter is connected to a second connection terminal of the averaging circuit generating the averaged switched voltage and a related converter output terminal of the second converter output terminal group.

5. Secondary side of an inductive power supply system according to claim 2, wherein the multiple input multiple output converter comprises a first rectifier circuit having a first half bridge set up from a pair of a first rectifying circuit element and a second rectifying circuit element connected in series to each other so as to form a first internal circuit node between the first rectifying circuit element and the second rectifying circuit element;
form a first half bridge output terminal at the first rectifying circuit element connected to a first converter output terminal of the first converter output terminal group; and
form a second half bridge output terminal at the second rectifying circuit element connected to the reference converter output terminal of the first converter output terminal group.

6. Secondary side of an inductive power supply system according to claim 5, the multiple input multiple output converter comprises at least one averaging circuit having its first connection terminal connected to the internal circuit node of the first rectifier circuit and its second connection terminal connected to a related converter output terminal of the second converter output terminal group;
wherein the averaging circuit is adapted to average a switched square wave voltage which is generated at the first internal circuit node of the first rectifier circuit during rectification operation;
and to output the averaged switched square wave voltage at the related converter output terminal of the second converter output terminal group during a period where the first rectifier circuit is blocking output of an alternating input signal to the first converter output terminal of the first converter output terminal group.

7. Secondary side of an inductive power supply system according to claim 5, the multiple input multiple output converter comprises a second rectifier circuit having a second half bridge set up from a pair of a third rectifying circuit element and of a fourth rectifier circuit element connected in series to each other so as to form a second internal circuit node between the third rectifying circuit element and the fourth rectifying circuit element;
form a third half bridge output terminal at the third rectifying circuit element connected to a second converter output terminal in the first converter output terminal group, the second converter output terminal being identical or different to the first converter output terminal of the first converter terminal output group connected to the first half bridge output terminal;
and form a fourth half bridge output terminal at the fourth rectifying circuit element connected to the reference converter output terminal of the first converter output terminal group.

8. Secondary side of an inductive power supply system according to claim 1, wherein in the multiple input multiple output converter the at least one averaging circuit is an inductor, a series connection of an inductor and a parallel connection of a capacitor and a load, or a parallel connection of an inductor and a capacitor.

9. Secondary side of an inductive power supply system according to claim 1, wherein the at least one energy storing device having voltage source characteristics is connected to the first converter output terminal group and the load is connected to the second converter output terminal group so as to balance the voltage of the energy storage device with respect to the voltage of the load.

10. Secondary side of an inductive power supply system according to claim 1, wherein the energy storage device is connected in series with the load or at least one further energy storing device, the series connection of the energy storage device is connected in series with the load or at least one further energy storing device is connected to output terminals of the first terminal group, and the intermediate node between the energy storage device and the load or at least one further energy storing device is connected to an output terminal of the second terminal group.

11. Method of operating a secondary side of an inductive power supply system according to claim 1, comprising the steps:
rectifying an alternating high frequency input signal having current source characteristics for output of a rectified alternating input signal as a signal having the first rectified signal characteristics; and
averaging a switched square wave voltage which is generated during rectification of the alternating high frequency input signal for output of an averaged switched voltage as a signal having the second averaged signal characteristics.

12. Multiple input multiple output converter for converting at least one alternating input signal into at least one signal having first signal characteristics and at least one signal having second signal characteristics being different from the first signal characteristics, comprising:
a plurality of converter input terminals for input of the at least one alternating input signal to the multiple input multiple output converter;
a plurality of converter output terminals separated into a first converter output terminal group for output of the at least one signal having the first signal characteristics and a second converter output terminal group for output of the at least one signal having the second signal characteristics;
at least one rectifier circuit adapted to rectify an alternating input signal, wherein the at least one rectifier circuit has a rectifier input terminal connected to a related converter input terminal and a rectifier output terminal connected to a related converter output terminal of the first converter output terminal group for output of a rectified alternating input signal as a signal having the first signal characteristics;
at least one averaging circuit adapted to average a switched voltage which is generated at an internal circuit node of the at least one rectifier circuit during rectification operation, wherein the at least one averaging circuit has a first input terminal connected to the internal circuit node of the at least one rectifier circuit and a second output terminal connected to a related converter output terminal of the second converter output terminal group for output of an averaged switched voltage as a signal having the second signal characteristics.

13. Multiple input multiple output converter according to claim 12, wherein:
the at least one rectifier circuit comprises at least one a half bridge set up from a pair of an upper rectifying circuit element and of a lower rectifying circuit element connected in series to each other so as to form an internal circuit node between the upper rectifying circuit element and the lower rectifying circuit element;
form an upper half bridge output terminal at the upper rectifying circuit element as a rectifier output terminal connected to a related converter output terminal of the first converter output terminal group for output of a rectified alternating input signal as a signal having the first signal characteristics;
form a second half bridge output terminal at the lower rectifying circuit element as a further rectifier output terminal connected to a reference converter output terminal of the first converter output terminal group.

14. Multiple input multiple output converter according to claim 13, wherein: the at least one averaging circuit has its first connection terminal connected to the internal circuit node of an associated rectifier circuit and its second connection terminal connected to a related converter output terminal of the second converter output terminal group;
wherein the averaging circuit is adapted to average a switched voltage which is generated at the internal circuit node of the associated rectifier circuit during rectification operation;
and to output an averaged switched voltage which is the average between the voltage at the internal circuit node when the upper rectifying circuit element is conducting and the voltage at the internal circuit node when the lower circuit element is conducting, at the related converter output terminal of the second converter output terminal group as a signal having the second signal characteristics.

15. Multiple input multiple output converter according to claim 13, wherein:
a first rectifier circuit having a first half bridge set up from a pair of a first rectifying circuit element and a second rectifying circuit element connected in series to each other so as to form a first internal circuit node between the first rectifying circuit element and the second rectifying circuit element;
form a first half bridge output terminal at the first rectifying circuit element connected to a first converter output terminal of the first converter output terminal group;
and form a second half bridge output terminal at the second rectifying circuit element connected to the reference converter output terminal of the first converter output terminal group.

16. Multiple input multiple output converter according to claim 15, comprising: at least one averaging circuit having its first connection terminal connected to the internal circuit node of the first rectifier circuit and its second connection terminal connected to a related converter output terminal of the second converter output terminal group;
wherein the averaging circuit is adapted to average a switched voltage which is generated at the first internal circuit node of the first rectifier circuit during rectification operation;
and to output the averaged switched voltage at the related converter output terminal of the second converter output terminal group during a period where the first rectifier circuit is blocking output of an alternating input signal to the first converter output terminal of the first converter output terminal group.

17. Multiple input multiple output converter according to claim 15, comprising:
a second rectifier circuit having a second half bridge set up from a pair of a third rectifying circuit element and of a fourth rectifier circuit element connected in series to each other so as to form a second internal circuit node between the third rectifying circuit element and the fourth rectifying circuit element;

form a third half bridge output terminal at the third rectifying circuit element connected to a second converter output terminal in the first converter output terminal group, the second converter output terminal being identical or different to the first converter output terminal of the first converter terminal output group connected to the first half bridge output terminal; and form a fourth half bridge output terminal at the fourth rectifying circuit element connected to the reference converter output terminal of the first converter output terminal group.

18. Multiple input multiple output converter according to claim 12, wherein:

the at least one averaging circuit is an inductor, a series connection of an inductor and a parallel connection of a capacitor and a load, or a parallel connection of an inductor and a capacitor.

19. Power supply system for supply of electric power to a plurality of loads and/or energy storage devices, comprising:

a multiple input multiple output converter according to claim 12 for converting at least one alternating input signal into at least one rectified signal for output at a first output terminal group, and into at least one averaged voltage signal derived from a switched voltage generated during rectification of the at least one alternating input signal for output at a second output terminal group;

wherein at least one first energy storage device or first load is connected to at least one output terminal of the first output terminal group and at least one second energy storage device or second load is connected to at least one output terminal of the second output terminal group so as to balance the voltage of the at least one first energy storage device or first load with respect to the voltage of the at least one second energy storage device or second load.

20. Power supply system according to claim 19, wherein a plurality of second energy storage devices or second loads are connected to output terminals of the second output terminal group to balance voltage levels of the plurality of second energy storage devices or second loads with respect to rated voltage levels of the plurality of second energy storage devices or second loads.

* * * * *